(12) United States Patent
Kaneko et al.

(10) Patent No.: US 10,884,498 B2
(45) Date of Patent: Jan. 5, 2021

(54) DISPLAY DEVICE AND METHOD FOR CONTROLLING DISPLAY DEVICE

(71) Applicant: SEIKO EPSON CORPORATION, Tokyo (JP)

(72) Inventors: Hideho Kaneko, Shiojiri (JP); Masahide Takano, Matsumoto (JP); Shinichi Kobayashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/667,142

(22) Filed: Oct. 29, 2019

(65) Prior Publication Data
US 2020/0133395 A1 Apr. 30, 2020

(30) Foreign Application Priority Data
Oct. 30, 2018 (JP) ................. 2018-203894

(51) Int. Cl.
*G06F 3/01* (2006.01)
*G02B 27/01* (2006.01)

(52) U.S. Cl.
CPC ........... *G06F 3/015* (2013.01); *G02B 27/017* (2013.01); *G06F 3/014* (2013.01); *G02B 2027/014* (2013.01); *G02B 2027/0138* (2013.01); *G02B 2027/0178* (2013.01)

(58) Field of Classification Search
CPC .......... G06F 3/015; G06F 3/014; G06F 3/013; G06F 3/03547; G06F 3/0346; G06F 3/017; G02B 27/017; G02B 2027/014; G02B 2027/0178; G02B 2027/0138; G02B 2027/0187
See application file for complete search history.

(56) References Cited

U.S. PATENT DOCUMENTS

| | | | |
|---|---|---|---|
| 9,649,558 B2 * | 5/2017 | Stafford | A63F 13/212 |
| 2016/0091980 A1 * | 3/2016 | Baranski | G06F 3/017 345/156 |
| 2017/0315620 A1 * | 11/2017 | Johri | G06F 3/0233 |
| 2017/0319134 A1 * | 11/2017 | Lee | H04N 9/3194 |
| 2018/0059811 A1 * | 3/2018 | Suzuki | G09G 5/00 |

FOREIGN PATENT DOCUMENTS

JP   2012-073830 A   4/2012

* cited by examiner

*Primary Examiner* — Andrew Sasinowski
(74) *Attorney, Agent, or Firm* — Oliff PLC

(57) ABSTRACT

An HMD includes: an image display unit of a transmissive type that is mounted on a head of a user and configured to transmit light; a display control unit configured to display on the image display unit an image for input at a position overlapping a hand of the user visually recognized through the image display unit; an acquisition unit configured to acquire a detected value of a myoelectric sensor mounted on a hand of the user; and an operation detection unit configured to detect an operation corresponding to the image for input that is displayed by the image display unit, based on the detected value of the myoelectric sensor acquired by the acquisition unit.

10 Claims, 13 Drawing Sheets

DISPLAY DEVICE AND METHOD FOR CONTROLLING DISPLAY DEVICE

The present application is based on, and claims priority from JP Application Serial Number 2018-203894, filed Oct. 30, 2018, the disclosure of which is hereby incorporated by reference herein in its entirety.

BACKGROUND

1. Technical Field

The present disclosure relates to a display device and a method for controlling the display device.

2. Related Art

Various interface devices that receive user operation are known in the related art (see, for example, JP-A-2012-73830).

For example, the interface device described in JP-A-2012-73830 is mounted on a hand of an operator. The interface device includes a member that contacts at least a part of a palm of one hand of the operator, a camera, and a detection means. The camera is arranged on one side of the member opposite to another side facing the palm of one hand. The detection means detects motion of one hand, based on an image captured by the camera.

SUMMARY

An advantage of some aspects of the disclosure is to provide a display device capable of improving the operability of a user.

An aspect of achieving the object described above includes a display device including a display unit of a transmissive type that is mounted on a head of a user and configured to transmit light, a display control unit configured to display on the display unit an image for input at a position overlapping a hand of the user visually recognized through the display unit, an acquisition unit configured to acquire a detected value of a sensor mounted on the hand of the user, and an operation detection unit configured to detect an operation corresponding to the image for input that is displayed by the display unit, based on the detected value of the sensor acquired by the acquisition unit.

In the display device described above, the sensor may include a myoelectric sensor mounted on a wrist of the user, and the operation detection unit may be configured to identify movement of the hand of the user from a detected value of the myoelectric sensor.

In the display device described above, the sensor may include a gyro sensor mounted on a finger of the hand of the user.

In the display device described above, the image for input may include a plurality of input candidate images, and the operation detection unit may be configured to detect an operation of selecting one input candidate image from among the plurality of input candidate images, based on the detected value of the sensor.

In the display device described above, the image for input may include a confirmation image for confirming a selection of the one input candidate image, and the operation detection unit may be configured to detect an operation of confirming a selection of the one input candidate image, based on the detected value of the sensor.

In the display device described above, the plurality of input candidate images may respectively indicate characters that are different from each other, and the operation detection unit may be configured to detect an operation of entering a character, based on the detected value of the sensor.

In the display device described above, the plurality of input candidate images may be associated with regions segmented by joints at each finger of the hand of the user.

In the display device described above, the plurality of input candidate images may be respectively associated with regions segmented by joints at each finger excluding a thumb of the hand of the user, and an operation of selecting the one input candidate image may be an operation of pressing the thumb of the hand of the user against any of the regions segmented by the joints.

In the display device described above, two or more predetermined number of input candidate images included in the plurality of input candidate images are associated with regions segmented by joints at each finger excluding the thumb of the hand of the user, an operation of selecting any of the regions is an operation of pressing the thumb of the hand of the user against any of the regions segmented by the joints, and an operation of selecting the one input candidate image from the predetermined number of input candidate images associated with the regions is an operation of moving the thumb of the hand of the user in a predetermined direction.

In the display device described above, the display control unit may be configured to display on the display unit a guide image for guiding a position of the hand of the user.

In the display device described above, the display control unit may be configured to track a position of the hand of the user visually recognized through the display unit, and adjust a display position of the image for input in response to movement of the hand of the user.

Another aspect of achieving the object described above is a method of controlling a display device including a display unit of a transmissive type that is mounted on a head of a user and configured to transmit light, the method including a display control step for displaying on the display unit an image for input at a position overlapping a hand of the user visually recognized through the display unit, an acquisition step for acquiring a detected value of a sensor mounted on the hand of the user, and an operation detection step for detecting an operation corresponding to the image for input that is displayed by the display unit, based on the detected value of the sensor acquired in the acquisition step.

DESCRIPTION OF EXEMPLARY EMBODIMENTS

Exemplary embodiments are described below with reference to the accompanying drawings.

Figure 1:
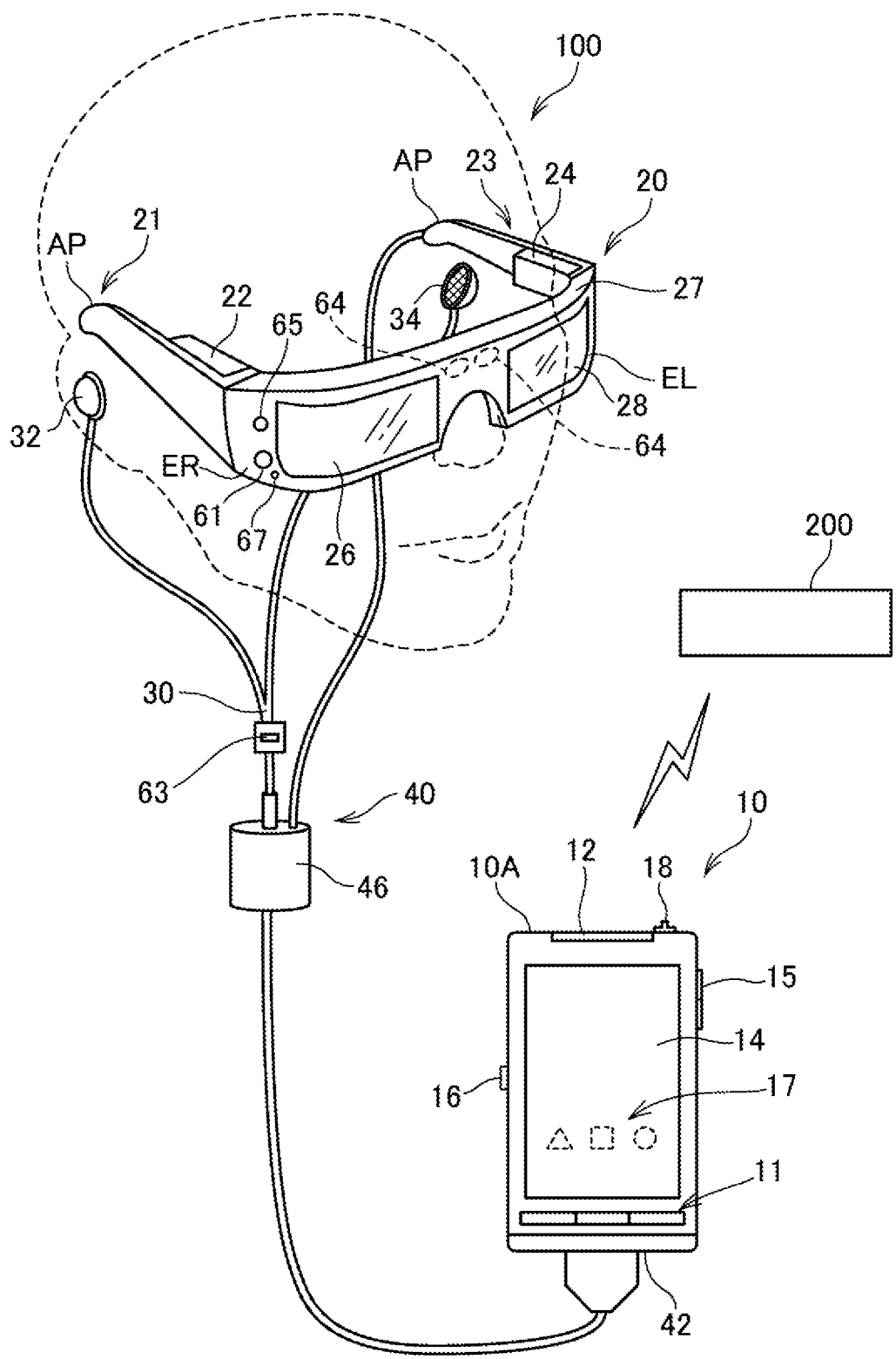
FIG. 1 is an explanatory view illustrating an external configuration of an HMD.

FIG. 1 is an explanatory view illustrating an external configuration of an HMD 100.

Note that the exemplary embodiments include a first exemplary embodiment described below with reference to FIGS. 8 and 9, a second exemplary embodiment described below with reference to FIG. 11, and a third exemplary embodiment described with reference to FIG. 13.

As illustrated in FIG. 1, the Head Mounted Display (HMD) 100 is a so-called see-through type (transmissive) HMD, which includes a control device 10 and an image display unit 20. The HMD 100 corresponds to an example of a "display device".

The control device 10 includes a flat box-shaped case 10A (housing). The case 10A includes various switches or a track pad 14 and the like for receiving user operations, and the control device 10 functions as a control device for controlling the HMD 100 by user's operations of the various switches and track pad 14 and the like. Furthermore, the case 10A includes a function unit for controlling the HMD 100.

The control unit 10 of the HMD 100 is wirelessly communicatively coupled to a myoelectric sensor 200. The myoelectric sensor 200 is mounted on a user's wrist.

The myoelectric sensor 200 detects electrical signals that are generated in response to muscle movement of user's thumb and fingers. In the exemplary embodiment, the myoelectric sensor 200 detects electrical signals that is generated primarily in response to muscle movement of a user's thumb.

The myoelectric sensor 200 is mounted on the user's wrist as described below with reference to FIG. 7. The myoelectric sensor 200 is formed in a cylindrical shape, and a plurality of sensors are disposed on an inner surface side thereof. The "inner surface side" indicates the side that is in contact with the outer circumferential surface of the user's wrist. The myoelectric sensor 200 is configured to detect movement of a plurality of muscles by the plurality of sensors.

The myoelectric sensor 200 includes a battery, a communication unit, a control unit, and an input/output unit. The communication unit is capable of communicating with the control unit 10 of the HMD 100 via wireless communication, such as Bluetooth (trade name), for example.

An image display unit 20 is a head-mounted body to be worn by the user on the head and has an eyeglasses-like shape in the exemplary embodiment. The image display unit 20 includes a main body including a right holding part 21, a left holding part 23, and a front frame 27. The main body further includes a right display unit 22, a left display unit 24, a right light-guiding plate 26, and a left light-guiding plate 28. The image display unit 20 corresponds to an example of a "display unit".

The right holding part 21 and the left holding part 23 extend rearward from both ends of the front frame 27, respectively, and hold the image display unit 20 to the head of the user in a manner similar to temples of a pair of eyeglasses. Here, one of both the ends of the front frame 27 located on the right side of the user in a state where the user wears the image display unit 20 is referred to as an end ER, and the other end located on the left side of the user in a state where the user wears the image display unit 20 is referred to as an end EL. The right holding part 21 extends from the end ER of the front frame 27 to a position corresponding to the right side of the head of the user in a state where the user wears the image display unit 20. The left holding part 23 extends from the end EL to a position corresponding to the left side of the head of the user in a state where the user wears the image display unit 20.

The right light-guiding plate 26 and the left light-guiding plate 28 are provided on the front frame 27. The right light-guiding plate 26 is located in front of the right eye of the user in a state where the user wears the image display unit 20, and causes the user to visually recognize an image with the right eye. The left light-guiding plate 28 is located in front of the left eye of the user in a state where the user wears the image display unit 20, and causes the user to visually recognize an image with the left eye.

The front frame 27 has a shape formed by coupling an end of the right light-guiding plate 26 and an end of the left light-guiding plate 28 to each other, and this coupling position corresponds to a position between eyebrows of the user in a state where the user wears the image display unit 20. The front frame 27 may include a nose pad provided at the coupling position of the right light-guiding plate 26 and the left light-guiding plate 28, and configured to abut on a nose of the user in a state where the user wears the image display unit 20. In this case, the image display unit 20 can be held to the head of the user by the nose pad, the right holding part 21, and the left holding part 23. Additionally, a belt (not illustrated) configured to be in contact with to a back of the head of the user in a state where the user wears the image display unit 20 may be coupled to the right holding part 21 and the left holding part 23, and in this case, the image display unit 20 can be held to the head of the user by the belt.

The right display unit 22 is a unit related to image display by the right light-guiding plate 26, and is provided on the right holding part 21, and located near the right side of the head of the user in a state where the user wears the image display unit 20. The left display unit 24 is a unit related to image display by the left light-guiding plate 28, and is provided on the left holding part 23, and located near the left side of the head of the user in a state where the user wears the image display unit 20.

The right light-guiding plate 26 and the left light-guiding plate 28 according to the exemplary embodiment are optical parts, e.g., prisms, formed of a light transmission-type resin or the like, and are configured to guide image light output by the right display unit 22 and the left display unit 24 to the eyes of the user.

An electronic shade (not illustrated) having a light-control function may be arranged on the surfaces of the right light-guiding plate 26 and the left light-guiding plate 28. The electronic shade includes terminals (not illustrated) that input a voltage, and a shade body (not illustrated) that changes the transmittance of light in accordance with the voltage between the terminals, and the voltage applied can be adjusted by controlling the control unit 141 described below. The electronic shade may be configured such that the transmittance in the entire wavelength range including visible light changes, or may be configured to have transmittances that differ depending on the wavelength range of the light. The electronic shade is, for example, disposed so as to cover the front side of the front frame 27, which is an opposite side to the side of the eyes of the user. By adjusting an optical property of the electronic shade, an amount of external light being incident on the right light-guiding plate 26 and the left light-guiding plate 28 from the outside and passing through the right light-guiding plate 26 and the left light-guiding plate 28 can be adjusted.

The image display unit 20 is configured to guide imaging light generated by the right display unit 22 and the left display unit 24 to the right light-guiding plate 26 and the left light-guiding plate 28, respectively, and to use this imaging light to cause the user to visually recognize a virtual image to display an image. When outside light passes through the right light-guiding plate 26 and the left light-guiding plate 28 and enters the eyes of the user from in front of the user, imaging light constituting the virtual image and the outside light enter the eyes of the user, and visibility of the virtual image is affected by intensity of the outside light. Thus, for example, the electronic shade can be mounted on the front frame 27, and the optical property of the electronic shade can be selected or adjusted appropriately to adjust easiness of visual recognition of the virtual image.

A camera 61 is arranged on the front frame 27 of the image display unit 20. The camera 61 desirably captures an image in an outside scene direction in which the user visually recognizes an outside scene in a state where the user wears the image display unit 20, and the camera 61 is provided at a position on a front face of the front frame 27 where the camera 61 does not block the outside light passing through the right light-guiding plate 26 and the left light-guiding plate 28. In the example in FIG. 1, the camera 61 is disposed on the end ER side of the front frame 27. The camera 61 may be disposed on the end EL side or may be disposed at the coupling of the right light-guiding plate 26 and the left light-guiding plate 28.

The camera 61 is a digital camera equipped with an imaging element, such as a charge coupled device (CCD) or a complementary metal oxide semiconductor (CMOS), and imaging lens and the like. The camera 61 according to the exemplary embodiment is a monocular camera, but may be a stereo camera. The camera 61 is configured to capture an image of at least part of an outside scene (real space) in a front direction of the HMD 100, i.e., in a direction of the field of view of the user wearing the HMD 100. In other words, it can be said that the camera 61 captures an image of a range overlapping with the field of view of the user or the direction of the field of view of the user, i.e., in a direction of a scene gazed at by the user. A width of an angle of view of the camera 61 can be set appropriately, but in the exemplary embodiment, as described later, the width of an angle of view of the camera 61 includes an outside world the user visually recognizes through the right light-guiding plate 26 and the left light-guiding plate 28. More preferably, the imaging range of the camera 61 is set to enable capturing all the field of view of the user that can be recognized visually through the right light-guiding plate 26 and the left light-guiding plate 28.

The camera 61 is configured to capture an image in accordance with instructions of a display control unit 142 included in the control unit 141, and output captured image data to the display control unit 142. The display control unit 142 will be described below with reference to FIG. 6.

The HMD 100 includes a distance sensor 64 that detects a distance between a measurement target object located in a predetermined measurement direction and the HMD 100. The distance sensor 64 may be configured to detect, for example, a distance to a measurement target object located in front of the user, and in exemplary embodiment, the distance sensor is disposed on a portion of the front frame 27 where the right light-guiding plate 26 and the left light-guiding plate 28 are coupled to each other. In this example, in a state where the user wears the image display unit 20, the distance sensor 64 is located substantially in the middle of both eyes of the user in a horizontal direction and above both eyes of the user in a vertical direction. The measurement direction of the distance sensor 64 may be, for example, a direction of the front side of the front frame 27, that is, a direction overlapping the capturing direction of the camera 61.

The distance sensor 64 includes, for example, a light source such as a light emitting diode (LED) and a laser diode and a light receiving unit that receives reflection light obtained by light emitted from the light source being reflected by a measurement target object. The distance sensor 64 may perform triangular distance measuring processing or distance measuring processing based on a time difference in accordance with instructions of the control unit 141. The distance sensor 64 may include a sound source that generates ultrasonic waves and a detection unit that receives ultrasonic waves reflected by the measurement target object. In this case, the distance sensor 64 may perform distance measuring processing, based on a time difference until the time when ultrasonic waves are reflected in accordance with instructions of the control unit 141.

The control device 10 and the image display unit 20 are coupled via a coupling cable 40. The coupling cable 40 is detachably coupled to a connector 42 provided at an end of the case 10A. In other words, the case 10A is provided with the connector 42 capable of withdrawing and inserting the coupling cable 40, and the coupling cable 40 is coupled to the connector 42 when the image display unit 20 is used.

The coupling cable 40 is coupled from a tip of the left holding part 23 to various circuits provided within the image display unit 20. The coupling cable 40 may include a metal cable or an optical fiber cable configured to transmit digital data, or may include a metal cable configured to transmit analog signals. A connector 46 is provided at a mid-point of the coupling cable 40.

The connector 46 is a jack (audio connector) used to couple a stereo mini-plug. The connector 46 and the control device 10 are coupled to each other with a line configured to transmit analog sound signals, for example. In the configuration example illustrated in FIG. 1, the connector 46 is coupled to a headset 30 including a microphone 63, and to a right ear piece 32 and a left ear piece 34 that form a stereo headphone.

Figure 5:
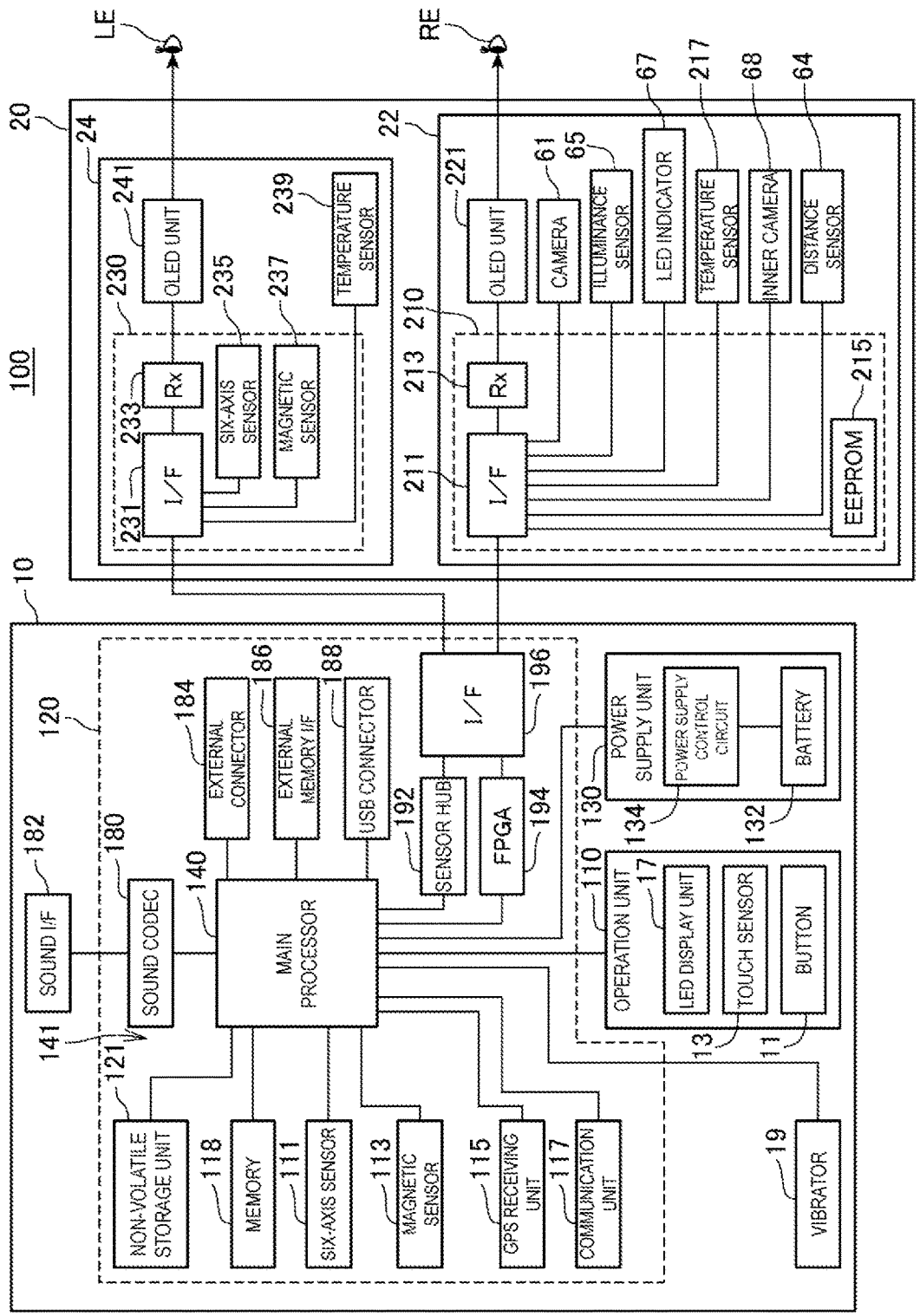
FIG. 5 is a diagram illustrating a configuration of components configuring the HMD.

As illustrated in FIG. 1, for example, the microphone 63 is positioned with a sound collector of the microphone 63 facing in a sight line direction of the user, and is configured to collect sound and output sound signals to a sound interface 182 illustrated in FIG. 5. The microphone 63 may be, for example, a monaural microphone or a stereo microphone, or may be a directional microphone or a non-directional microphone.

The control device 10 includes a track pad 14, an up/down key 15, a LED display unit 17, and a power switch 18 as operated units to be operated by the user. The operated units described above are arranged on a surface of the case 10A. The operated units are operated with a hand or a finger of the user, for example.

The track pad 14 is a region on the front face of the case 10A for performing touch operations in which the user contacts a finger on region. The track pad 14 may be a planar surface similar to the front face of the case 10A, but is preferably configured to allow the user to identify the track pad 14 and other regions. For example, lines indicating the edges of the track pad 14 may be formed by printing or unevenness, or the track pad 14 may be subjected to surface processing that causes the tactile impression of the surface of the track pad 14 to be different from other regions.

The control device 10 can detect a user contact operation to the track pad 14 by a touch sensor 13 on the front face of the case 10A illustrated in FIG. 5. The control device 10 identifies a position at which an operation is detected when the touch sensor 13 detects a contact operation. The track pad 14 can be used for operation to enter absolute positions or relative positions in the track pad 14.

A LED display unit 17 is provided on the front face of the case 10A. The LED display unit 17 is located in the track pad 14, and the surface of LED display 17 is not different from other regions on the front face of case 10A. The LED display unit 17 includes a transmission part (not illustrated) capable of transmitting light, and emits light so that the user can visually recognize symbols, and the like, by one or more LEDs installed directly under the transmission part illuminating. In the example illustrated in FIG. 1, by the LEDs of the LED display unit 17 illuminating, three symbols triangle, circle, and square (quadrangle) appear.

The control device 10 detects a contact operation of a finger of the user to the LED display unit 17 by the touch sensor 13, and can identify the operation position. Thus, for example, it is identified that the operation position corresponds to which position of the symbols appearing in the LED display unit 17. Accordingly, the LED display unit 17 functions as a software button. For example, by associating the symbols appearing on the LED display unit 17 with functions of the HMD 100, a touch operation on the LED display unit 17 can be detected as an operation with respect to the function. The HMD 100 may assign a symbol (circle) to the home button in the example of FIG. 1. In this case, when the contact operation is performed on the position of the symbol (circle) the control unit 141 detects the operation of the home button. The symbol (square) may be assigned to the history button. In this case, the control unit 141 detects the contact operation of the symbol (square) as the operation of the history button. Similarly, the symbol (triangle) may be assigned to the back button. The control unit 141 detects the contact operation of the symbol (triangle) as the operation of the back button.

The up/down key 15 is disposed on a side surface of the case 10A, and includes a pair of keys that detect a pressing operation. The up/down key 15 is utilized to input an instruction to increase or decrease the sound volume output from the right ear piece 32 and the left ear piece 34, and to input an instruction to increase or decrease the brightness of the display of the image display unit 20.

The power switch 18 is used to turn on and off a power supply to the HMD 100.

A universal serial bus (USB) connector 188 illustrated in FIG. 5 is provided on a side surface in the case 10A on the same side as the power switch 18. The USB connector 188 is an interface for coupling the control device 10 to an external device, and an example of the interface in the exemplary embodiment is a connector conforming to the USB standard. The USB connector 188 is, for example, a connector having a shape and size that conforms to the micro USB standard, and a specification such as a transfer speed is arbitrary.

The control device 10 includes a battery 132 illustrated in FIG. 5, and the control device 10 and the image display unit 20 operates by the power supplied by the battery 132. The battery 132 can be charged by supplying power to the USB connector 188. The HMD 100 can perform charging by disconnecting the control unit 10 from the image display unit 20 and coupling only the control unit 10 to a dedicated charging device.

Figure 2:
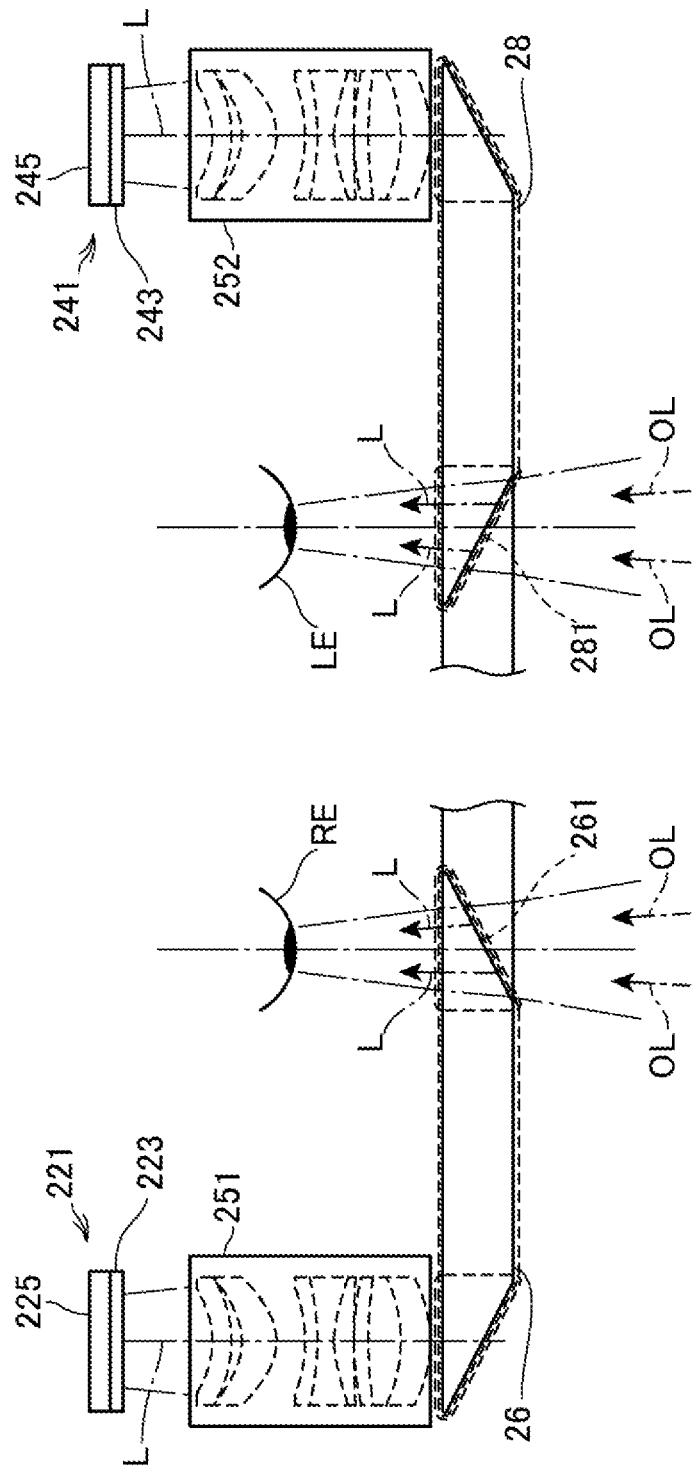
FIG. 2 is a diagram illustrating a configuration of an optical system of an image display unit.

FIG. 2 is a plan view illustrating a main part of a configuration of an optical system included in the image display unit 20. In FIG. 2, a left eye LE and a right eye RE of a user are illustrated for description.

As illustrated in FIG. 2, the right display unit 22 and the left display unit 24 are disposed symmetrically on the right- and left-hand sides. As a configuration where the right eye RE of the user is caused to visually recognize an image, the right display unit 22 includes an organic light-emitting diode (OLED) unit 221 configured to emit imaging light. Additionally, the right display unit 22 includes a right optical system 251 including a lens group configured to guide imaging light L emitted by the OLED unit 221, and the like. The imaging light L is guided by the right optical system 251 to the right light-guiding plate 26.

The OLED unit 221 includes an OLED panel 223 and an OLED drive circuit 225 configured to drive the OLED panel 223. The OLED panel 223 is a self-light emission type display panel including light-emitting elements disposed in a matrix and configured to emit light by organic electro-luminescence to emit red (R) color light, green (G) color light, and blue (B) color light respectively. The OLED panel 223 has, as one pixel, a unit including one R element, one G element, and one B element, and includes a plurality of the pixels, and the OLED panel 223 forms an image with the plurality of pixels disposed in a matrix. The OLED drive circuit 225 is controlled by the control unit 141 to select and power the light-emitting elements included in the OLED panel 223 to cause the light-emitting elements of the OLED panel 223 to emit light. The OLED drive circuit 225 is fixed by bonding or the like to a rear face of the OLED panel 223, namely, a back side of a light-emitting surface of the OLED panel 223. The OLED drive circuit 225 may include, for example, a semiconductor device configured to drive the OLED panel 223, and may be mounted on a substrate (not illustrated) fixed to the rear face of the OLED panel 223. A temperature sensor 217 illustrated in FIG. 5 is mounted on this substrate.

Note that the OLED panel 223 may include a configuration in which light-emitting elements configured to emit white color light are disposed in a matrix, and color filters corresponding to the R color, the G color, and the B color respectively are disposed to be superimposed on the light-emitting elements. Additionally, the OLED panel 223 of a WRGB configuration including light-emitting elements configured to emit white (W) color light may be used, in addition to the light-emitting elements configured to emit the R color light, the G color light, and the B color light respectively.

The right optical system 251 includes a collimate lens configured to collimate the imaging light L emitted from the OLED panel 223. The imaging light L collimated by the collimate lens enters the right light-guiding plate 26. In an optical path configured to guide light inside the right light-guiding plate 26, a plurality of reflective faces configured to reflect the imaging light L is formed. The imaging light L is reflected multiple times inside the right light-guiding plate 26 and then, is guided to the right eye RE side. In the right light-guiding plate 26, a half mirror 261 (reflective face) located in front of the right eye RE is formed. The imaging light L is reflected by the half mirror 261 to be emitted from the right light-guiding plate 26 toward the right eye RE, and this imaging light L forms an image on a retina of the right eye RE, and causes the user to visually recognize the image.

Additionally, as a configuration in which the left eye LE of the user is caused to visually recognize an image, the left display unit 24 includes an OLED unit 241 configured to emit imaging light, and a left optical system 252 including a lens group configured to guide the imaging light L emitted by the OLED unit 241, and the like. The imaging light L is guided by the left optical system 252 to the left light-guiding plate 28.

The OLED unit 241 includes an OLED panel 243, and an OLED drive circuit 245 configured to drive the OLED panel 243. The OLED panel 243 is a self-light emission type display panel configured in a manner similar to the OLED panel 223. The OLED drive circuit 245 is instructed by the control unit 141 to select and power the light-emitting elements included in the OLED panel 243 to cause the light-emitting elements of the OLED panel 243 to emit light. The OLED drive circuit 245 is fixed by bonding or the like to a rear face of the OLED panel 243, namely, a back side of a light-emitting surface of the OLED panel 243. The OLED drive circuit 245 may include, for example, a semiconductor device configured to drive the OLED panel 243, and may be mounted on a substrate (not illustrated) fixed to the rear face of the OLED panel 243. A temperature sensor 239 is mounted on this substrate.

The left optical system 252 includes a collimate lens configured to collimate the imaging light L emitted from the OLED panel 243. The imaging light L collimated by the collimate lens enters the left light-guiding plate 28. The left light-guiding plate 28 is an optical element in which a plurality of reflective faces configured to reflect the imaging light L is formed, and the left light-guiding plate 28 is, for example, a prism. The imaging light L is reflected multiple times inside the left light-guiding plate 28 and then, is guided to the left eye LE side. In the left light-guiding plate 28, a half mirror 281 (reflective face) located in front of the left eye LE is formed. The imaging light L is reflected by the half mirror 281 to be emitted from the left light-guiding plate 28 to the left eye LE, and this imaging light L forms an image on a retina of the left eye LE, and causes the user to visually recognize the image.

According to the configuration, the HMD 100 serves as a display device of a transmissive type. Namely, the imaging light L reflected by the half mirror 261 and outside light OL having passed through the right light-guiding plate 26 enter the right eye RE of the user. Additionally, the imaging light L reflected by the half mirror 281 and the outside light OL having passed through the half mirror 281 enter the left eye LE. As described above, the HMD 100 allows the imaging light L of the image processed internally and the outside light OL to enter the eyes of the user in an overlapped manner, and the user can see the outside scene through the right light-guiding plate 26 and the left light-guiding plate 28, and can visually recognize the image based on the imaging light L overlapping with the outside scene.

The half mirrors 261 and 281 are image extracting units configured to reflect the imaging light output by the right display unit 22 and the left display unit 24 respectively to extract images, and can be referred to as a display unit.

Note that the left optical system 252 and the left light-guiding plate 28 are collectively referred to as a "left light-guiding unit", and the right optical system 251 and the right light-guiding plate 26 are collectively referred to as a "right light-guiding unit". Configurations of the right light-guiding unit and the left light-guiding unit are not limited to the example described above, and can use any manner as long as imaging light is used to form a virtual image in front of the eyes of the user. For example, a diffraction grating may be used, or a semi-transmissive reflection film may be used.

Figure 3:
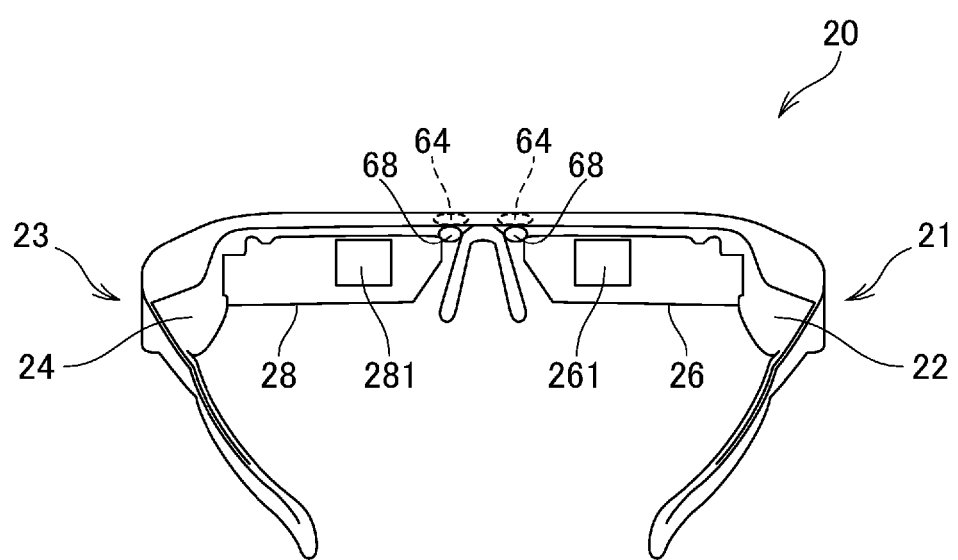
FIG. 3 is a perspective view illustrating a configuration of a main part of the image display unit.
Figure 4:
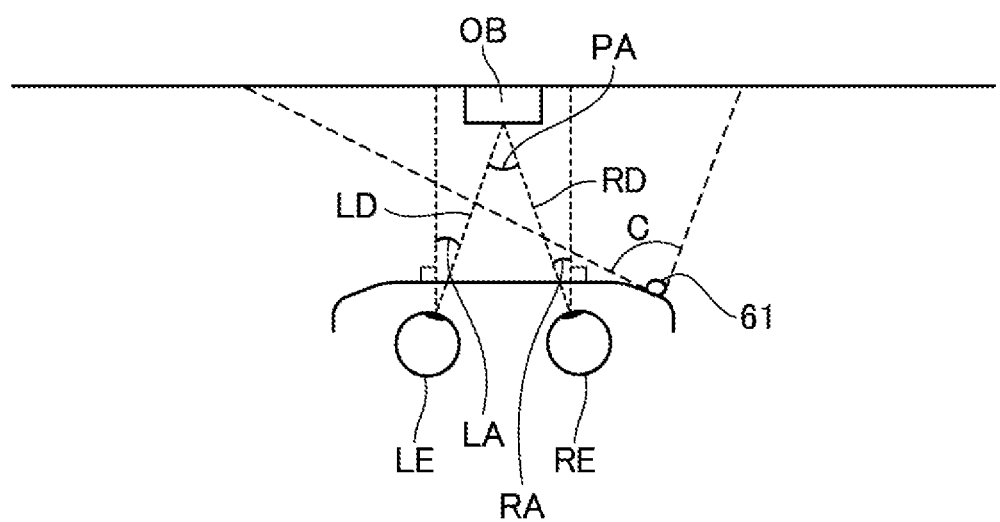
FIG. 4 is a schematic diagram illustrating a relationship between a position of a target object and an imaging range.

FIGS. 3 and 4 are diagrams illustrating a configuration of a main part of the image display unit 20. FIG. 3 is a perspective view of the main part of the image display unit 20 seen from a head side of the user. Note that, in FIG. 3, illustration of the coupling cable 40 is omitted. FIG. 4 is a schematic diagram illustrating a relationship between a position of a target object and an imaging range of the camera 61.

FIG. 3 illustrates a side contacting the head of the user of the image display unit 20, that is, a side seen from the right eye RE and the left eye LE of the user. In other words, in FIG. 3, back sides of the right light-guiding plate 26 and the left light-guiding plate 28 are visible.

In FIG. 3, the half mirror 261 configured to irradiate the right eye RE of the user with imaging light and the half mirror 281 configured to irradiate the left eye LE with imaging light are visible as approximately square-shaped regions. Additionally, all the right light-guiding plate 26 and the left light-guiding plate 28 including the half mirrors 261 and 281 transmit the outside light as described above. Thus, the user visually recognizes an outside scene through all the right light-guiding plate 26 and the left light-guiding plate 28, and visually recognizes rectangular display images at positions of the half mirrors 261 and 281.

As described above, the camera 61 is disposed at the end on the right side in the image display unit 20, and captures an image in a direction in which both the eyes of the user are directed, namely, in front of the user. FIG. 4 schematically illustrates a position of the camera 61 together with the right eye RE and the left eye LE of the user in a plan view. An angle of view (imaging range) C of the camera 61 is illustrated. Note that the angle of view C in a horizontal direction is illustrated in FIG. 4, but an actual angle of view of the camera 61 also extends in a top-bottom direction as in a manner similar to a general digital camera.

The optical axis of the camera 61 extends in a direction including sight line directions of the right eye RE and the left eye LE. The outside scene that can be recognized visually by the user in a state where the user wears the HMD 100 is not necessarily an infinitely distant scene. For example, as illustrated in FIG. 4, when the user fixates on a target object OB with both eyes, the sight line of the user is directed to the target object OB as illustrated by reference signs RD and LD in the figure. In this case, a distance from the user to the target object OB often ranges from approximately 30 cm to 10 m, and more often ranges from approximately 1 m to 4 m. Thus, standards of an upper limit and a lower limit of the distance from the user to the target object OB in normal use may be defined for the HMD 100. These standards may be determined by research or an experiment, or may be set by the user. The optical axis and the angle of view of the camera 61 may preferably be set such that when the distance to the target object OB in normal use corresponds to the set standard of the upper limit, and when the distance to the target object OB in normal use corresponds to the set standard of the lower limit, this target object OB is present within the angle of view.

Additionally, in general, a visual field angle of a human is approximately 200 degrees in the horizontal direction and approximately 125 degrees in the vertical direction, and an effective field of view excellent in information acceptance performance of the visual field angle of a human is approximately 30 degrees in the horizontal direction and approximately 20 degrees in the vertical direction. Further, a stable field of fixation in which a point of fixation at which a human fixates is promptly and stably visible ranges from approximately 60 degrees to 90 degrees in the horizontal direction, and ranges from approximately 45 degrees to 70 degrees in the vertical direction. In this case, when the point of fixation is located at the target object OB in FIG. 4, the effective field of view is approximately 30 degrees in the horizontal direction and approximately 20 degrees in the vertical direction with the lines of sight RD and LD as the center. Additionally, the stable field of fixation ranges from approximately 60 degrees to 90 degrees in the horizontal direction and from approximately 45 degrees to 70 degrees in the vertical direction, and a visual field angle is approximately 200 degrees in the horizontal direction, and approximately 125 degrees in the vertical direction. Further, an actual visual field in which the user visually recognizes through the image display unit 20, and through the right light-guiding plate 26, and the left light-guiding plate 28 can be referred to as an actual Field Of View (FOV). In the configuration of the exemplary embodiment illustrated in FIG. 3, the actual field of view corresponds to the actual visual field visually recognized by the user through the right light-guiding plate 26 and the left light-guiding plate 28. The actual field of view is narrower than the visual field angle and the stable field of fixation, but wider than the effective field of view.

The angle of view C of the camera 61 can preferably capture an image in the range wider than the visual field of the user, and specifically, the angle of view C is preferably wider than at least the effective field of view of the user. Additionally, the angle of view C is more preferably wider than the actual field of view of the user. Further preferably, the angle of view C is wider than the stable field of fixation of the user, and most preferably, the angle of view C is wider than the visual field angles of both the eyes of the user.

The camera 61 may include a so-called wide angle lens as an imaging lens and may be configured to be capable of capturing an image at a wide angle of view. The wide angle lens may include lenses referred to as an ultrawide lens and a quasi wide lens, or may be a single focus lens or a zoom lens, or the camera 61 may be configured to include a lens group including a plurality of lenses.

The distance sensor 64 is disposed to be directed forward in the middle of the right light-guiding plate 26 and the left light-guiding plate 28. For example, the distance sensor 64 is configured to detect a distance from a central position of the image display unit 20 to an object located in a front direction of the user, such as the target object OB illustrated in FIG. 4. The user wearing the HMD 100 faces the head in the gazing direction so that the gazed target can be considered to be in front of the image display unit 20. Thus, when the distance sensor 64 disposed in the center of the image display unit 20 supposes the front side of the image display unit 20 as the detection direction 64A, the distance to the target at which the user gazes can be detected.

As illustrated in FIG. 3, inner cameras 68 are disposed on the user side of the image display unit 20. A pair of inner cameras 68 are provided in a central position between the right light-guiding plate 26 and the left light-guiding plate 28 so as to correspond respectively to the right eye RE and the left eye LE of the user. The inner cameras 68 are a pair of cameras that respectively capture an image of the right eye RE and the left eye LE of the user. The inner cameras 68 captures an image in accordance with instructions from the control unit 141. The control unit 141 analyzes the captured image data of the inner cameras 68. For example, the control unit 141 detects an image of the reflected light and the pupil on the surface of the eyeball of the right eye RE and the left eye LE from the imaging data of the inner camera 68, and determines the sight line direction of the user. The control unit 141 may determine the change in the sight line direction of the user and may detect the eyeball movement of each of the right eye RE and the left eye LE.

Here, the movement of the user's line of sight can also be seen as movement of the user's virtual viewpoint.

The control unit 141 may extract an image of the eyelid of the user's right eye RE and left eye LE from the captured image data of the inner cameras 68 to detect the eyelid movement or may detect the eyelid state. In the exemplary embodiment, the image display unit 20 includes a pair of inner cameras 68 and 68, but for example, one inner camera 68 may be provided at the central position of the image display unit 20. In this case, it is preferred that one inner camera 68 has an angle of view that allows the right eye RE and the left eye LE to be captured, but for example, only one of the right eye RE and the left eye LE may be captured by the inner camera 68. That is, the control unit 141 may detect the sight line direction, eye movement, eyelid movement, eyelid state, and the like of either one of the right eye RE or the left eye LE.

When detecting the sight line direction of the right eye RE and the left eye LE from the captured image of the inner camera(s) 68, the control unit 141 can determine the convergence angle of the right eye RE and the left eye LE. In FIG. 4, the convergence angle is indicated by a symbol PA. The convergence angle PA corresponds to a distance to the target object OB that the user fixates on. That is, when the user sterically views an image and an object, the convergence angle of the right eye RE and the left eye LE is determined in accordance with the distance to the target visually recognized. Accordingly, the convergence angle can be detected to evaluate a distance from where the user fixates on. Further, when an image is displayed so as to guide the convergence angle of the user, a stereoscopic view can be induced.

The convergence angle can, for example, be determined from the captured image data of the inner camera(s) 68. For example, the sight line direction of the right eye RE is determined from the captured image data of the inner camera 68, and from the sight line direction, the angle LA in the sight line direction of the right eye RE with respect to the front direction of the right eye RE is determined. Similarly, the sight line direction of the left eye LE is determined from the captured image data of the inner camera 68, and based on the sight line direction, the angle RA of the left eye LE in the sight line direction with respect to the front direction of the left eye LE is determined. The convergence angle PA is equal to the sum of the angle LA and the angle RA, so the convergence angle PA can be easily determined.

FIG. 5 is a diagram illustrating a configuration of components configuring the HMD 100.

As illustrated in FIG. 5, the control device 10 includes a main processor 140 that executes a program to control the HMD 100. The main processor 140 is coupled with a memory 118 and a non-volatile storage unit 121. The main processor 140 is coupled with an operating unit 110 as an input device. The main processor 140 is further coupled with sensors, such as a six-axis sensor 111, a magnetic sensor 113, and a global positioning system (GPS) 115. A communication unit 117, a sound codec 180, an external connector 184, an external memory interface 186, a USB connector 188, a sensor hub 192, and an FPGA 194 are coupled to the main processor 140. The components function as an interface to external devices.

The main processor 140 is mounted on a controller substrate 120 built into the control device 10. In addition to the main processor 140, the memory 118, the nonvolatile storage 121, and the like may be mounted on the controller substrate 120. In the exemplary embodiment, the six-axis sensor 111, the magnetic sensor 113, the GPS 115, the communication unit 117, the memory 118, the non-volatile storage unit 121, the sound codec 180, and the like are mounted on the controller substrate 120. Further, the external connector 184, the external memory interface 186, the USB connector 188, the sensor hub 192, the FPGA 194, and an interface 196 may be mounted on the controller substrate 120.

When the main processor 140 executes a control program, the memory 118 configures work area used to temporarily store a control program to be executed and data to be processed. The non-volatile storage unit 121 includes a flash memory and an embedded multi-media card (eMMC). The non-volatile storage unit 121 is configured to store programs to be executed by the main processor 140, and various types of data to be processed after executing a program by the main processor 140.

The main processor 140 detects a contact operation on the operating surface of the track pad 14, based on the operation signal input from the operation unit 110, and acquires the operating position.

The operation unit 110 includes a button 11, a touch sensor 13, and an LED display unit 17. The touch sensor 13 detects a touch operation on the track pad 14 and identifies the operating position of the detected touch operation. In this case, the operation unit 110 outputs an operation signal including data indicating the touch position on the track pad 14 to the main processor 140. When the button 11 is operated, and when the touch sensor 13 detects a touch operation, an operation signal is output from the operation unit 110 to the main processor 140.

The LED display unit 17 includes the LED (FIG. 3) arranged immediately below the track pad 14, and a drive circuit for turning on the LED. The LED display unit 17 turns on, blinks, or turns off the LED in accordance with the control by the main processor 140.

The six-axis sensor 111 is a motion sensor (inertial sensor) including a three-axis acceleration sensor and a three-axis gyro (angular velocity) sensor. The six-axis sensor 111 may include an inertial measurement unit (IMU) in which the sensors are provided as modules.

The magnetic sensor 113 is a three-axis geomagnetic sensor, for example.

The Global Positioning System (GPS) 115 includes a GPS antenna (not illustrated) and receives a radio signal transmitted from a GPS satellite to detect the coordinates of the current position of the control device 10.

The six-axis sensor 111, the magnetic sensor 113, and the GPS 115 are configured to output detected values to the main processor 140 in accordance with a predetermined sampling frequency. Alternatively, the six-axis sensor 111, the magnetic sensor 113, and the GPS 115 output detected values to the main processor 140 at a timing specified by the main processor 140, in response to a request of the main processor 140.

The communication unit 117 performs wireless communication between an external device and the communication unit 117. In the exemplary embodiment, the communication unit 117 performs wireless communication with the myoelectric sensor 200. The communication unit 117 includes an antenna, an RF circuit, a baseband circuit, a communication control circuit, and the like, or is formed of a device that combines an antenna, an RF circuit, a baseband circuit, a communication control circuit, and the like. The communication unit 117 is configured to perform wireless communications conforming to the standard of Bluetooth (trade name), wireless LAN (including Wi-Fi (trade name)), or the like.

The sound interface 182 is an interface configured to input and output the sound signals. In the exemplary embodiment, the sound interface 182 includes the connector 46 (FIG. 3) provided on the coupling cable 40. The sound codec 180 is coupled to the sound interface 182 and is configured to encode and decode sound signals input and output via the sound interface 182. The sound codec 180 may include an analog/digital (A/D) converter configured to convert an analog sound signal into digital sound data and a digital/analog (D/A) converter configured to perform the opposite conversion. For example, the HMD 100 according to the exemplary embodiment outputs sounds from the right ear piece 32 and the left ear piece 34, and collects sounds from the microphone 63. The sound codec 180 converts digital sound data output from the main processor 140 into an analog sound signal and outputs the analog sound signal via the sound interface 182. The sound codec 180 is also configured to convert an analog sound signal input to the sound interface 182 into digital sound data, and output the digital sound data to the main processor 140.

The external connector 184 is a connector configured to couple the external device to perform communications with the main processor 140. The external connector 184 is an interface that couples an external device to the main processor 140 when, for example, the external device is coupled to debug a program executed by the main processor 140 and collect logs of operations of the HMD 100.

The external memory interface 186 is an interface capable of coupling portable memory devices, and includes, for example, an interface circuit and a memory card slot capable of accepting a card-type recording medium for reading data. In such a case, the size, shape, and standard of the card-type recording medium are not limited, and can be appropriately changed.

The USB connector 188 includes a connector conforming to the USB standard, and an interface circuit, and can couple a USB memory device, a smartphone, a computer, and the like. The size and shape of the USB connector 188, as well as the compatible version of the USB standard for the USB connector 188 can be appropriately selected or changed. When the HMD 100 and a remote controller 350 are coupled by a USB cable, the USB connector 188 is coupled to the remote controller 350.

The HMD 100 further includes a vibrator 19. The vibrator 19 includes a motor (not illustrated), an eccentric rotor (not illustrated), and the like, and is controlled by the main processor 140 to create a vibration. The HMD 100 causes the vibrator 19 to generate vibration in a predetermined vibration pattern, for example, when an operation on the operation unit 110 is detected, or when the power supply of the HMD 100 is turned on and off.

The sensor hub 192 and the FPGA 194 are coupled to the image display unit 20 through the interface (I/F) 196. The sensor hub 192 is configured to acquire detected values of various sensors included in the image display unit 20, and output the detected values to the main processor 140. Further, the FPGA 194 is configured to process data to be transmitted and received between the main processor 140 and components of the image display unit 20, as well as to transmit data via the interface 196.

The right display unit 22 and the left display unit 24 of the image display unit 20 are each coupled to the control device 10. As illustrated in FIG. 3, in the HMD 100, the coupling cable 40 is coupled to the left holding part 23. A wire coupled to the coupling cable 40 is arranged in the image display unit 20 to couple the right display unit 22 and the left display unit 24 to the control device 10.

The right display unit 22 includes a display unit substrate 210. The display unit substrate 210 is mounted with an interface (I/F) 211 coupled to the interface 196, a reception unit (Rx) 213 configured to receive data input from the control device 10 via the interface 211, and an EEPROM 215 (storage unit).

The interface 211 couples the reception unit 213, the EEPROM 215, the temperature sensor 217, the camera 61, an illuminance sensor 65, and an LED indicator 67 to the control device 10.

The electrically erasable programmable ROM (EEPROM) 215 stores various types of data so as to be readable by the main processor 140. The EEPROM 215 stores, for example, data about light-emitting properties and display properties of the OLED units 221 and 241 provided in the image display unit 20, and data about a property of a sensor provided in the right display unit 22 or the left display unit 24. Specifically, the EEPROM 215 stores parameters regarding gamma correction of the OLED units 221 and 241, data used to compensate for detected values of the temperature sensors 217 and 239, and the like. The data is generated when the HMD 100 is inspected upon shipping from a factory, and is written to the EEPROM 215, and after shipment, the main processor 140 can use the data of the EEPROM 215 to perform the processing.

The camera 61 performs capturing in response to a signal input through the interface 211, and outputs captured image data or a signal indicating a capturing result to the control device 10.

As illustrated in FIG. 3, the illuminance sensor 65 is provided at the end ER of the front frame 27 and disposed so as to receive external light from the front of the user wearing the image display unit 20. The illuminance sensor 65 is configured to output a detected value corresponding to an amount of received light (intensity of received light).

As illustrated in FIG. 3, the LED indicator 67 is disposed near the camera 61 at the end ER of the front frame 27. The LED indicator 67 is configured to be turned on during image capturing by the camera 61 to notify that the image capturing is in progress.

The temperature sensor 217 is configured to detect a temperature and output a voltage value or a resistance value corresponding to the detected temperature as a detected value. The temperature sensor 217 is mounted on the rear face side of the OLED panel 223 (FIG. 3). The temperature sensor 217 may be mounted, for example, on the same substrate as the substrate on which the OLED drive circuit 225 is mounted. According to this configuration, the temperature sensor 217 mainly detects a temperature of the OLED panel 223.

The inner camera 68 performs capturing in response to a signal input from the control device 10 through the interface 211, and outputs captured image data or a signal indicating a capturing result to the control device 10. The pair of inner cameras 68 and 68 illustrated in FIG. 3 may operate simultaneously. Each of the pair of inner cameras 68 and 68 may be coupled with the interface 211 and may be configured to operate independently of each other.

The distance sensor 64 performs distance detection in response to a signal input from the control device 10 through the interface 211, and outputs a signal indicating a detection result to the control device 10. The pair of distance sensors 64 and 64 illustrated in FIG. 3 may operate simultaneously. Each of the pair of distance sensors 64 and 64 may be coupled with the interface 211 and operate independently of each other.

The reception unit 213 is configured to receive data transmitted by the main processor 140 via the interface 211. The reception unit 213, upon receiving image data of an image to be displayed on the OLED unit 221, outputs the received image data to the OLED drive circuit 225 (FIG. 2).

The left display unit 24 includes the display unit substrate 210. The display unit substrate 210 is mounted with an interface (I/F) 231 coupled to the interface 196, and a reception unit (Rx) 233 configured to receive data input from the control device 10 via the interface 231. Additionally, on the display unit substrate 210, a six-axis sensor 235 (motion sensor), and a magnetic sensor 237 are mounted.

The interface 231 couples the reception unit 233, the six-axis sensor 235, the magnetic sensor 237, and the temperature sensor 239 to the control device 10.

The six-axis sensor 235 is a motion sensor (inertial sensor) including a three-axis acceleration sensor and a three-axis gyro (angular velocity) sensor. As the six-axis sensor 235, an Inertial Measurement Unit (IMU) including the above-described sensors as modules may be adopted.

The magnetic sensor 237 is a three-axis geomagnetic sensor, for example.

The temperature sensor 239 is configured to detect a temperature and output a voltage value or a resistance value corresponding to the detected temperature as a detected value. The temperature sensor 239 is mounted on the rear face side of the OLED panel 243 (FIG. 3). The temperature sensor 239 may be mounted, for example, on the same substrate as the substrate on which the OLED drive circuit 245 is mounted. According to this configuration, the temperature sensor 239 mainly detects a temperature of the OLED panel 243.

Additionally, the temperature sensor 239 may be built in the OLED panel 243 or the OLED drive circuit 245. Additionally, the substrate may be a semiconductor substrate. Specifically, when the OLED panel 243 is mounted, as an Si-OLED, together with the OLED drive circuit 245 and the like to form an integrated circuit on an integrated semiconductor chip, the temperature sensor 239 may be mounted on this semiconductor chip.

The camera 61, the distance sensor 64, the illumination sensor 65, the inner camera 68, the temperature sensor 217 provided in the right display unit 22 and the six-axis sensor 235, the magnetic sensor 237, and the temperature sensor 239 provided in the left display unit 24 are coupled to the sensor hub 192. The sensor hub 192 is configured to be controlled by the main processor 140 to set and initialize sampling periods of the sensors. Based on the sampling periods of the sensors, the sensor hub 192 supplies power to the sensors, transmits control data, and acquires detected values, for example. At a pre-set timing, the sensor hub 192 outputs detected values of the sensors included in the right display unit 22 and the left display unit 24 to the main processor 140. The sensor hub 192 may include a function for temporarily holding the detected values of the sensors in accordance with the timing of output to the main processor 140. Further, the sensor hub 192 may have a function of supporting a difference in a signal format or data format of the output value from each sensor, and converting the output value to data in a unified data format to output the data to the main processor 125.

The sensor hub 192 is controlled by the main processor 140 to start and stop supplying power to the LED indicator 67 to turn on or off the LED indicator 67 in accordance with the timing when the camera 61 starts and ends capturing images.

The control device 10 includes the power supply unit 130 and operates with power supplied from the power supply unit 130. The power supply unit 130 includes a rechargeable battery 132, and a power supply control circuit 134 configured to detect a remaining amount of the battery 132, and control the charging of the battery 132. The power supply control circuit 134 is coupled to the main processor 140, and is configured to output, to the main processor 140, the detected value of the remaining amount of the battery 132, or the detected value of a voltage. Power may be supplied from the control device 10 to the image display unit 20, based on power supplied by the power supply unit 130. The main processor 140 may be able to control a state of the power supplied from the power supply unit 130 to each of the units of the control device 10 and the image display unit 20.

The HMD 100 may include an interface (not illustrated) that couples various external devices being supply sources of contents. For example, the interface may be an interface compatible with wired connection, such as a USB interface, a micro USB interface, a memory card interface, or may be a wireless communication interface. The external devices in this case are image supply devices that supply an image to the HMD 100. A personal computer (PC), a cellular phone terminal, a portable game machine, and the like are used. In this case, the HMD 100 can output an image and sound based on the content data input from these external devices.

Figure 6:
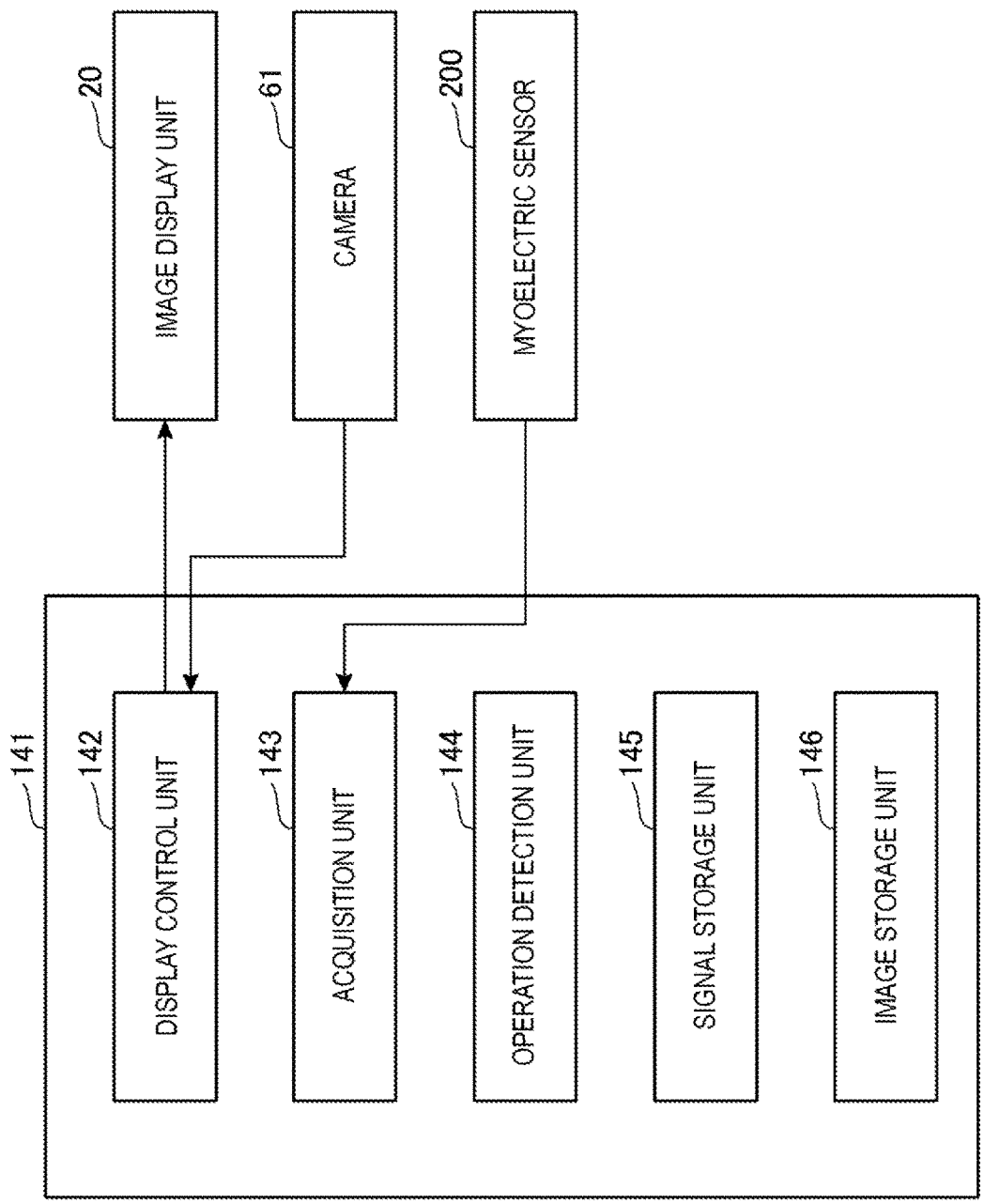
FIG. 6 is a diagram illustrating a configuration of a control unit.

FIG. 6 is a diagram illustrating a configuration of the control unit 141.

As illustrated in FIG. 6, the control unit 141 includes a display control unit 142, an acquisition unit 143, an operation detection unit 144, a signal storage unit 145, and an image storage unit 146. Specifically, the main processor 140 executes the control program in the memory 118 to function as the display control unit 142, the acquisition unit 143, and the operation detection unit 144. The main processor 140 executes the control program in the memory 118 to cause the memory 118 to function as the signal storage unit 145 and the image storage unit 146.

The display control unit 142 causes the image display unit 20 to display an image M for input at a position overlapping the user's hand visually recognized through the image display unit 20.

Specifically, the display control unit 142 identifies the position of the user's hand included in the outside scene, based on image data acquired by the camera 61. Then, the display control unit 142 causes the image display unit 20 to display the image M for input so as to overlap the identified position of the user's hand. In other words, the display control unit 142 determines the display position of the image M for input to the identified position of the user's hand.

The display control unit 142 tracks the position of the user's hand visually recognized through the image display unit 20 and adjusts the display position of the image M for input in response to the movement of the user's hand.

Specifically, the image M for input includes a plurality of input candidate images MN. Each of the plurality of input candidate images MN indicates characters that are different from each other. The plurality of input candidate images MN will be described in detail with reference to FIGS. 8 and 11.

The display control unit 142 causes the image display unit 20 to display a first guide image GL1 that guides the position of the user's hand. The display control unit 142 causes the image display unit 20 to display a second guide image GL2 that guides the position of the myoelectric sensor 200. The first guide image GL1 and the second guide image GL2 will be described in detail with reference to FIG. 7.

The acquisition unit 143 acquires the detected value of the sensor mounted on the user's hand.

Specifically, the acquisition unit 143 acquires the detected value of the myoelectric sensor 200 mounted on the user's wrist.

The signal storage unit 145 stores the detected value of the myoelectric sensor 200.

Specifically, the signal storage unit 145 stores the detected value of the myoelectric sensor 200 corresponding to the operation of selecting each of the plurality of input candidate images MN.

The detected value of the myoelectric sensor 200 stored in the signal storage unit 145 is obtained by, for example, a prior calibration. For example, the detected value of the myoelectric sensor 200 is stored in association with information indicating the user. In other words, the detected value of the myoelectric sensor 200 is stored for each user.

Furthermore, the detected value of the myoelectric sensor 200 stored in the signal storage unit 145 is repeatedly detected with the myoelectric sensor 200 installed in a proper position by the user. Then, the average value is stored in the signal storage unit 145. Furthermore, the range of the detected values of the myoelectric sensor 200 may be stored in the signal storage unit 145 instead of the average value.

The image storage unit 146 stores an image displayed by the display control unit 142. Specifically, the image storage unit 146 stores images such as the plurality of input candidate images MN, the first guide image GL1, and the second guide image GL2.

The operation detection unit 144 detects an operation corresponding to the image M for input displayed by the image display unit 20, based on the detected value of the myoelectric sensor 200 acquired by the acquisition unit 143.

Specifically, the operation detection unit 144 detects the operation of selecting one input candidate image MA from among the plurality of input candidate images MN, based on the detected value of the myoelectric sensor 200.

More specifically, the operation detection unit 144 detects the operation of selecting one input candidate image MA from among the plurality of input candidate images MN, based on the detected value of the myoelectric sensor 200 and the detected value of the myoelectric sensor 200 stored in the signal storage unit 145.

Figure 7:
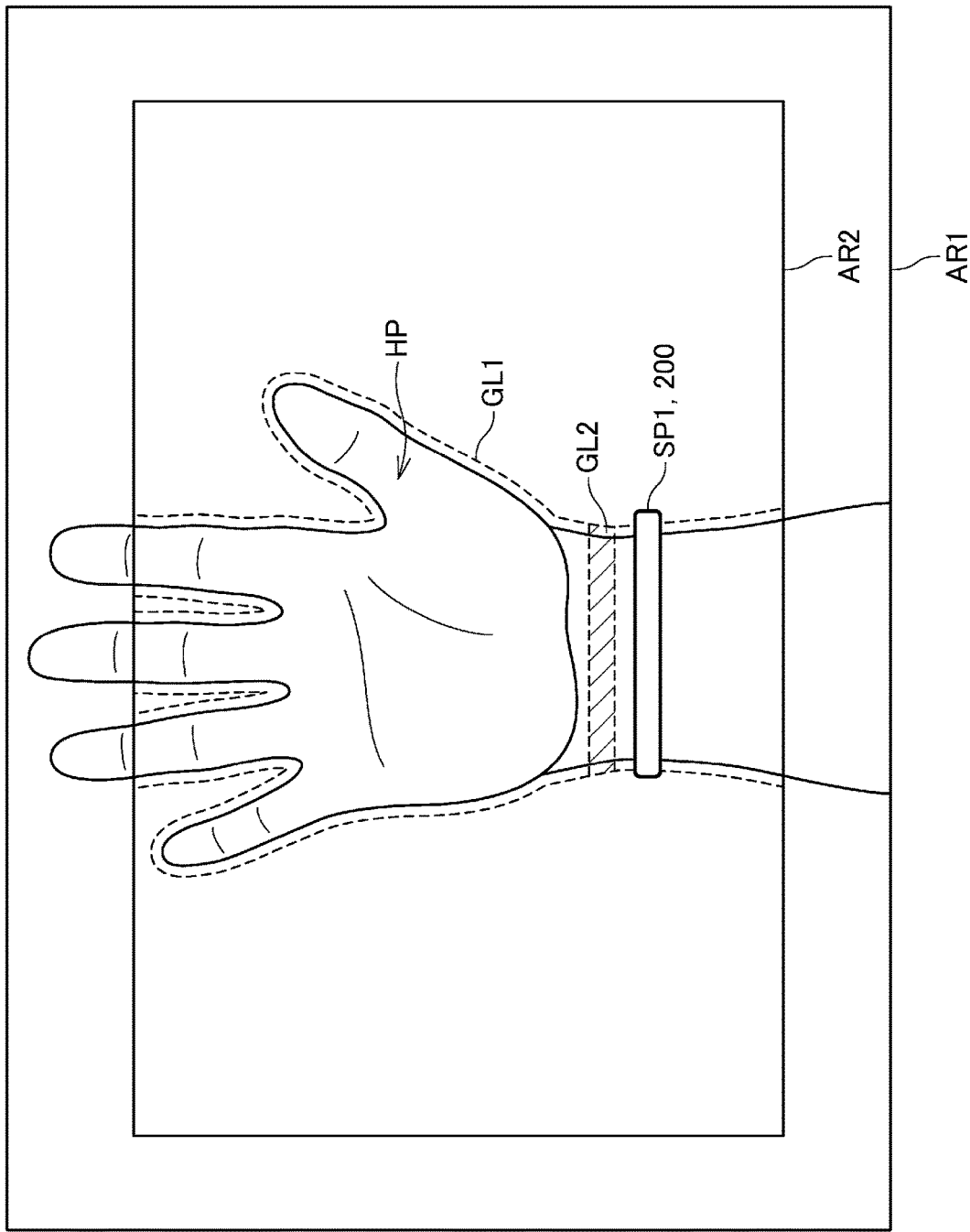
FIG. 7 is a diagram illustrating a guide image.

FIG. 7 illustrates a guide image GL.

A visual field region AR1 and an image region AR2 are illustrated in FIG. 7. The visual field region AR1 indicates a range of the real space scenery that is recognizable by the user by the external light transmitted through the right light-guiding plate 26 and the external light transmitted through the left light-guiding plate 28. In other words, the visual field region AR1 indicates a range of the field of view of the user wearing the HMD 100. The visual field region AR1 includes the user's right hand HP. Furthermore, the myoelectric sensor 200 is mounted at the position PS1 on the wrist of the user's right hand HP.

The image region AR2 indicates a range of the image that is recognizable by the user by the image light guided by the right light-guiding plate 26 and the image light guided by the left light-guiding plate 28. In other words, the image region AR2 indicates a range of the image that is recognizable by the user wearing the HMD 100. The image region AR2 includes the first guide image GL1 and the second guide image GL2.

The first guide image GL1 guides the position of the user's hand. Specifically, the first guide image GL1 indicates the position at which the user's right hand HP is to be placed in real space. As illustrated in FIG. 7, the user's right hand HP is positioned at the position indicated by the first guide image GL1.

The second guide image GL2 indicates the position of the wrist of the user's right hand HP to be worn with the myoelectric sensor 200 for detecting the correct electrical signal by the myoelectric sensor 200. In FIG. 7, the second guide image GL2 is closer to the palm of the hand than the position PS1 indicating the position of the myoelectric sensor 200 in the real space.

In this way, when the position PS1 of the myoelectric sensor 200 does not overlap with the second guide image GL2, the display control unit 142 displays by flashing the second guide image GL2.

The user needs to bring the myoelectric sensor 200 closer to the palm of the hand so that the position PS1 of the myoelectric sensor 200 overlaps the second guide image GL2.

Note that, although, in the exemplary embodiment, when the position PS1 of the myoelectric sensor 200 does not overlap with the second guide image GL2, the display control unit 142 displays by flashing the second guide image GL2, the present disclosure is not limited to this. When the position PS1 of the myoelectric sensor 200 does not overlap with the second guide image GL2, the display control unit 142 may change the display form of the second guide image GL2. For example, the display control unit 142 may change the display color of the second guide image GL2.

First Exemplary Embodiment

Figure 8:
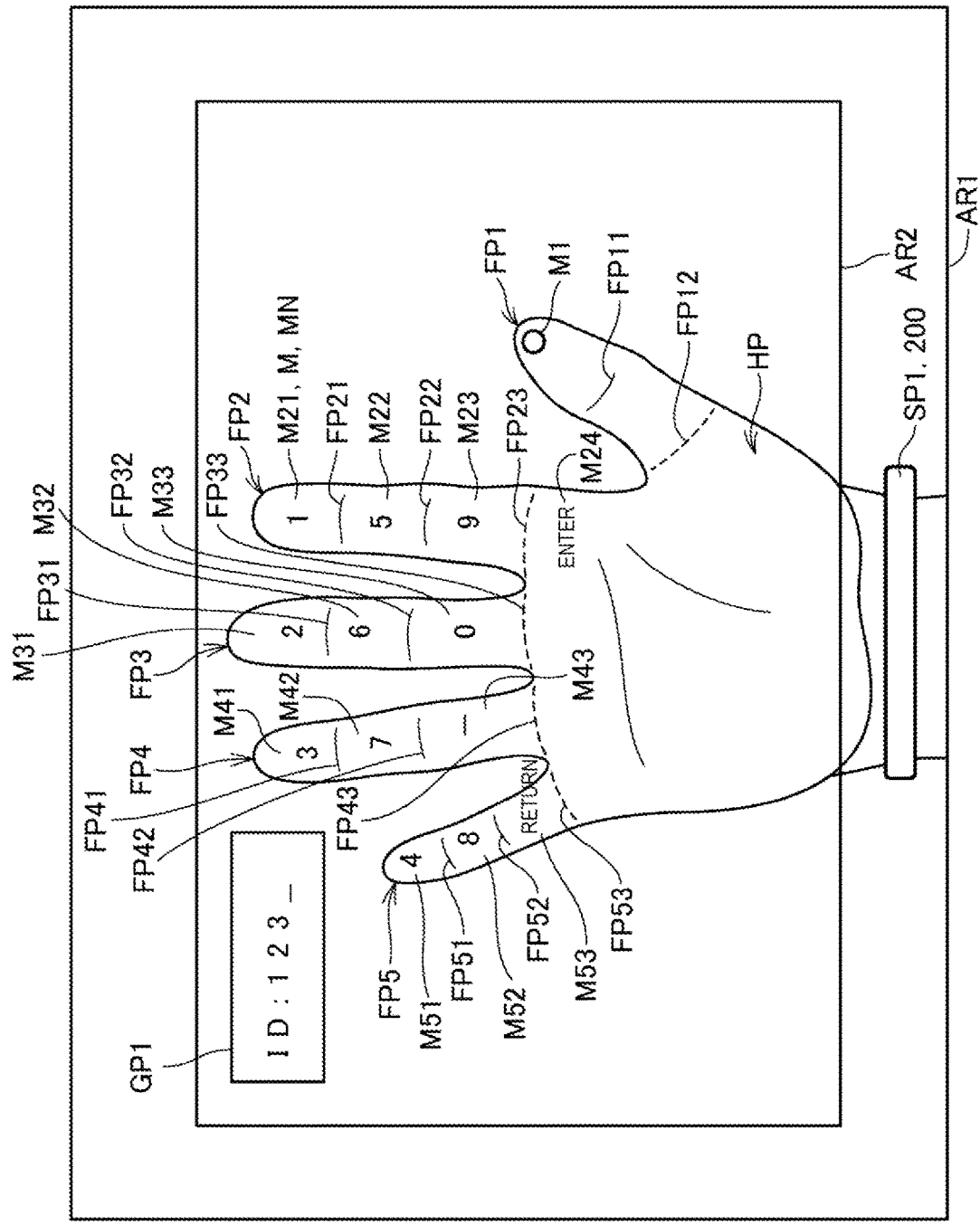
FIG. 8 is a diagram illustrating an input candidate image according to a first exemplary embodiment.

FIG. 8 is a diagram illustrating input candidate images MN according to the first exemplary embodiment.

As in FIG. 7, the visual field region AR1 and the image region AR2 are illustrated in FIG. 8.

The image region AR2 includes the user's right hand HP. Furthermore, the myoelectric sensor 200 is mounted at the position PS1 on the wrist of the user's right hand HP.

In the first exemplary embodiment, a case where the HMD 100 receives the input of the user ID will be described. A guide image GP1 is displayed in the image region AR2 in FIG. 8. The guide image GP1 is displayed as "ID:123_".

The guide image GP1 indicates that, as the user ID, a number of "1", a number of "2", and a number of "3" are entered. The "_" indicating a cursor of the guide image GP1 indicates a state of awaiting input of a fourth character as the user ID.

Each of the plurality of input candidate images MN indicates characters that are different from each other. As illustrated in FIG. 8, for example, each of the plurality of input candidate images MN includes numbers from "0" to "9", a symbol "-", an enter command, and a return command.

The enter command indicates a command to enter the input of the user ID. The return command indicates a command to erase a character of the characters input as the user ID. Specifically, the plurality of input candidate images MN are respectively associated with regions segmented by the joints at fingers of the user's right hand HP.

More specifically, the plurality of input candidate images MN are respectively associated with regions segmented by the joints at each finger, excluding the thumb FP1 of the user's right hand HP.

The user's right hand HP includes a thumb FP1, an index finger FP2, a middle finger FP3, a ring finger FP4, and a pinky finger FP5.

The index finger FP2 includes a first joint FP21, a second joint FP22, and a third joint FP23.

In the index finger FP2, an input candidate image M21 is displayed in the region from the tip side of the first joint FP21. The input candidate image M21 indicates a number of "1". The tip side indicates the side away from the palm.

In other words, the display control unit 142 causes the image display unit 20 to display the input candidate image M21 at a position overlapping the region on the tip side from the first joint FP21 of the index finger FP2 of the user's right hand HP visually recognized through the image display unit 20.

Specifically, the display control unit 142 identifies the position of the region on the tip side from the first joint FP21 of the index finger FP2 of the user's right hand HP included in the outside scene, based on the image data acquired by the camera 61. The display position of the input candidate image M21 is determined to be the identified position of the region on the tip side from the first joint FP21 of the index finger FP2 of the user's right hand HP.

Note that the input candidate image M21 corresponds to an example of the image M for input. The input candidate image M21 corresponds to an example of the plurality of input candidate images MN.

For the input candidate images MN excluding the input candidate image M21 included in the plurality of input candidate images MN, the reference sign MN indicating the plurality of input candidate images MN, and the reference sign M indicating the image M for input are omitted in FIG. 8. Furthermore, in each of FIGS. 10 to 13, the reference sign MN and the reference sign M are omitted.

An input candidate image M22 is displayed in the region between the first joint FP21 and the second joint FP22. The input candidate image M22 indicates a number of "5".

In other words, the display control unit 142 causes the image display unit 20 to display the input candidate image M22 at a position overlapping the region between the first joint FP21 and the second joint FP22 of the index finger FP2 of the user's right hand HP visually recognized through the image display unit 20.

In the index finger FP2, an input candidate image M23 is displayed in the region between the second joint FP22 and the third joint FP23. The input candidate image M23 indicates a number of "9".

In other words, the display control unit 142 causes the image display unit 20 to display the input candidate image M23 at a position overlapping the region between the second joint FP22 and the third joint FP23 of the index finger FP2 of the user's right hand HP visually recognized through the image display unit 20.

An input candidate image M24 is displayed in the region of the palm adjacent to the third joint FP23 of the index finger FP2. The input candidate image M24 corresponds to an example of the "confirmation image". The input candidate image M24 indicates an enter command.

That is, the input candidate image M24 indicates a command to confirm the input of each number and symbol constituting the user ID. The input candidate image M24 indicates a command to confirm the user ID. The input candidate image M24 indicates a character string of "enter".

The display control unit 142 causes the image display unit 20 to display the input candidate image M24 at a position overlapping a region of the palm adjacent to the third joint FP23 of the user's right hand HP visually recognized through the image display unit 20.

The middle finger FP3 includes a first joint FP31, a second joint FP32, and a third joint FP33.

In the middle finger FP3, an input candidate image M31 is displayed in the region on the tip side from the first joint FP31. The input candidate image M31 indicates a number of "2".

In the middle finger FP3, an input candidate image M32 is displayed in the region between the first joint FP31 and the second joint FP32. The input candidate image M32 indicates a number of "6".

In the middle finger FP3, an input candidate image M33 is displayed in the region between the second joint FP32 and the third joint FP33. The input candidate image M33 indicates a number of "0".

The display control unit 142 causes the image display unit 20 to display each of the input candidate image M31 to the input candidate image M33 at positions overlapping the regions segmented by the joints on the middle finger FP3 of the user's right hand HP visually recognized through the image display unit 20. The regions segmented by the joints includes a region on the tip side from the first joint FP31, a region between the first joint FP31 and the second joint FP32, and a region between the second joint FP32 and the third joint FP33.

The ring finger FP4 includes a first joint FP41, a second joint FP42, and a third joint FP43.

In the ring finger FP4, an input candidate image M41 is displayed in the region on the tip side from the first joint FP41. The input candidate image M41 indicates a number of "3".

In the ring finger FP4, an input candidate image M42 is displayed in the region between the first joint FP41 and the second joint FP42. The input candidate image M42 indicates a number of "7".

In the ring finger FP4, an input candidate image M43 is displayed in the region between the second joint FP42 and the third joint FP43. The input candidate image M43 indicates a symbol of "-".

The display control unit 142 causes the image display unit 20 to display each of the input candidate image M41 to the input candidate image M43 at positions overlapping the regions segmented by the joints in the ring finger FP4 of the user's right hand HP visually recognized through the image display unit 20. The regions segmented by the joints includes a region on the tip side from the first joint FP41, a region between the first joint FP41 and the second joint FP42, and a region between the second joint FP42 and the third joint FP43.

The pinky finger FP5 includes a first joint FP51, a second joint FP52, and a third joint FP53.

In the pinky finger FP5, an input candidate image M51 is displayed in the region on the tip side from the first joint FP51. The input candidate image M51 indicates a number of "4".

In the pinky finger FP5, an input candidate image M52 is displayed in the region between the first joint FP51 and the second joint FP52. The input candidate image M52 indicates a number of "8".

In the pinky finger FP5, an input candidate image M53 is displayed in the region between the second joint FP52 and the third joint FP53. The input candidate image M53 indicates a command to erase a character of the characters input as the user ID. The input candidate image M53 indicates a character of "return".

The display control unit 142 causes the image display unit 20 to display each of the input candidate image M51 and the input candidate image M52 at positions overlapping the regions segmented by the joints at the pinky finger FP5 of the user's right hand HP visually recognized through the image display unit 20. The regions segmented by the joints includes a region on the tip side from the first joint FP51, a region between the first joint FP51 and the second joint FP52, and a region between the second joint FP52 and the third joint FP53.

The operation detection unit 144 detects the operation of selecting one input candidate image MA from among the plurality of input candidate images MN, based on the detected value of the myoelectric sensor 200.

Specifically, the operation of selecting one input candidate image MA is an operation of pressing the thumb FP1 of the user's right hand HP to a region segmented by the joints in each of the index FP2, the middle finger FP3, the ring finger FP4, and the pinky finger FP5.

In other words, the gesture for selecting one input candidate image MA is a gesture of pressing the thumb FP1 of the user's right hand HP to a region segmented by the joints in each of the index FP2, the middle finger FP3, the ring finger FP4, and the pinky finger FP5.

Because the gesture is detected by the operation detection unit 144, based on the detected value of the myoelectric sensor 200, the gesture may be described as a "myoelectric gesture" so that it can be distinguished from typical gestures.

The thumb FP1 of the user's right hand HP includes a first joint FP11 and a second joint FP12. In the thumb FP1, a guide image M1 is displayed in a region on the tip side from the first joint FP11. The guide image M1 indicates, for example, a symbol of the circle. The guide image M1 indicates that one input candidate image MA is selected by pressing the region on the tip side of the first joint FP11 to the operation of pressing a region segmented by the joints.

For example, when selecting the input candidate image M21 indicating a number of "1", the user performs an operation of pressing the region on the tip side from the first joint FP11 of the thumb FP1 to the region on the tip side of the first joint FP21 of the index finger FP2.

For example, when selecting the input candidate image M32 indicating a number of "6", the user performs an operation of pressing the region on the tip side from the first joint FP11 of the thumb FP1 to the region between the first joint FP31 and the second joint FP32 of the middle finger FP3.

For example, when selecting the input candidate image M43 indicating a symbol of "-", the user performs an operation of pressing the region on the tip side from the first joint FP11 of the thumb FP1 to the region between the second joint FP42 and the third joint FP43 of the ring FP4.

For example, when selecting the input candidate image M24 indicating an enter command, the user performs an operation of pressing the region on the tip side from the first joint FP11 of the thumb FP1 to the region of the palm adjacent to the third joint FP23 of the index finger FP2.

The operation detection unit 144 detects the operation of selecting one input candidate image MA from among the plurality of input candidate images MN, based on the detected value of the myoelectric sensor 200 acquired by the acquisition unit 143.

The plurality of input candidate images MN includes numbers from "0" to "9", a symbol "-", an enter command, and a return command. Specifically, the plurality of input candidate images MN correspond to the input candidate image M21 to the input candidate image M24, the input candidate image M31 to the input candidate image M33, the input candidate image M41 to the input candidate image M43, and the input candidate image M51 to the input candidate image M53. In other words, the plurality of input candidate images MN indicate the 13 input candidate images MN illustrated in FIG. 8. The operation detection unit 144 detects the operation of selecting one input candidate image MA from among 13 input candidate images MN, based on the detected value of the myoelectric sensor 200 acquired by the acquisition unit 143.

The signal storage unit 145 stores the detected value of the myoelectric sensor 200 corresponding to the operation of selecting each of the 13 input candidate images MN.

The detected value of the myoelectric sensor 200 stored in the signal storage unit 145 is repeatedly detected for each user and for each operation of selecting each of the 13 input candidate images MN, with the user wearing the myoelectric sensor 200 in the proper position. Then, the average value is stored in the signal storage unit 145 in association with the operation of selecting each of the 13 input candidate images MN. Furthermore, the range of the detected values of the myoelectric sensor 200 may be stored in the signal storage unit 145 instead of the average value.

The operation detection unit 144 detects the operation of selecting one input candidate image MA from among the 13 input candidate images MN, based on the detected value of the myoelectric sensor 200 and the detected value of the myoelectric sensor 200 stored in the signal storage unit 145.

For example, when the detected value of the myoelectric sensor 200 indicates an operation of pressing the region on the tip side from the first joint FP11 of the thumb FP1 to the region on the tip side from the first joint FP21 of the index finger FP2, the operation detection unit 144 detects the operation of selecting the input candidate image M21.

For example, when the detected value of the myoelectric sensor 200 indicates an operation of pressing the region on the tip end side from the first joint FP11 of the thumb FP1 to the region between the first joint FP31 and the second joint FP32 of the middle finger FP3, the operation detection unit 144 performs the following process. In other words, the operation detection unit 144 detects the operation of selecting the input candidate image M32.

For example, when the detected value of the myoelectric sensor 200 indicates an operation of pressing the region on the tip side of the first joint FP11 of the thumb FP1 to the region between the second joint FP42 and the third joint FP43 of the ring finger FP4, the operation detection unit 144 performs the following process. In other words, the operation detection unit 144 detects the operation of selecting the input candidate image M43.

For example, when the detected value of the myoelectric sensor 200 indicates an operation of pressing the region on the tip side from the first joint FP11 of the thumb FP1 to the region of the palm adjacent to the third joint FP23 of the index finger FP2, the operation detection unit 144 performs the following process. In other words, the operation detection unit 144 detects the operation of selecting the input candidate image M24.

In this way, the operation detection unit 144 detects the operation of selecting one input candidate image MA from among the 13 input candidate images MN, based on the detected value of the myoelectric sensor 200 and the detected value of the myoelectric sensor 200 stored in the signal storage unit 145. As a result, a user ID is entered.

Figure 9:
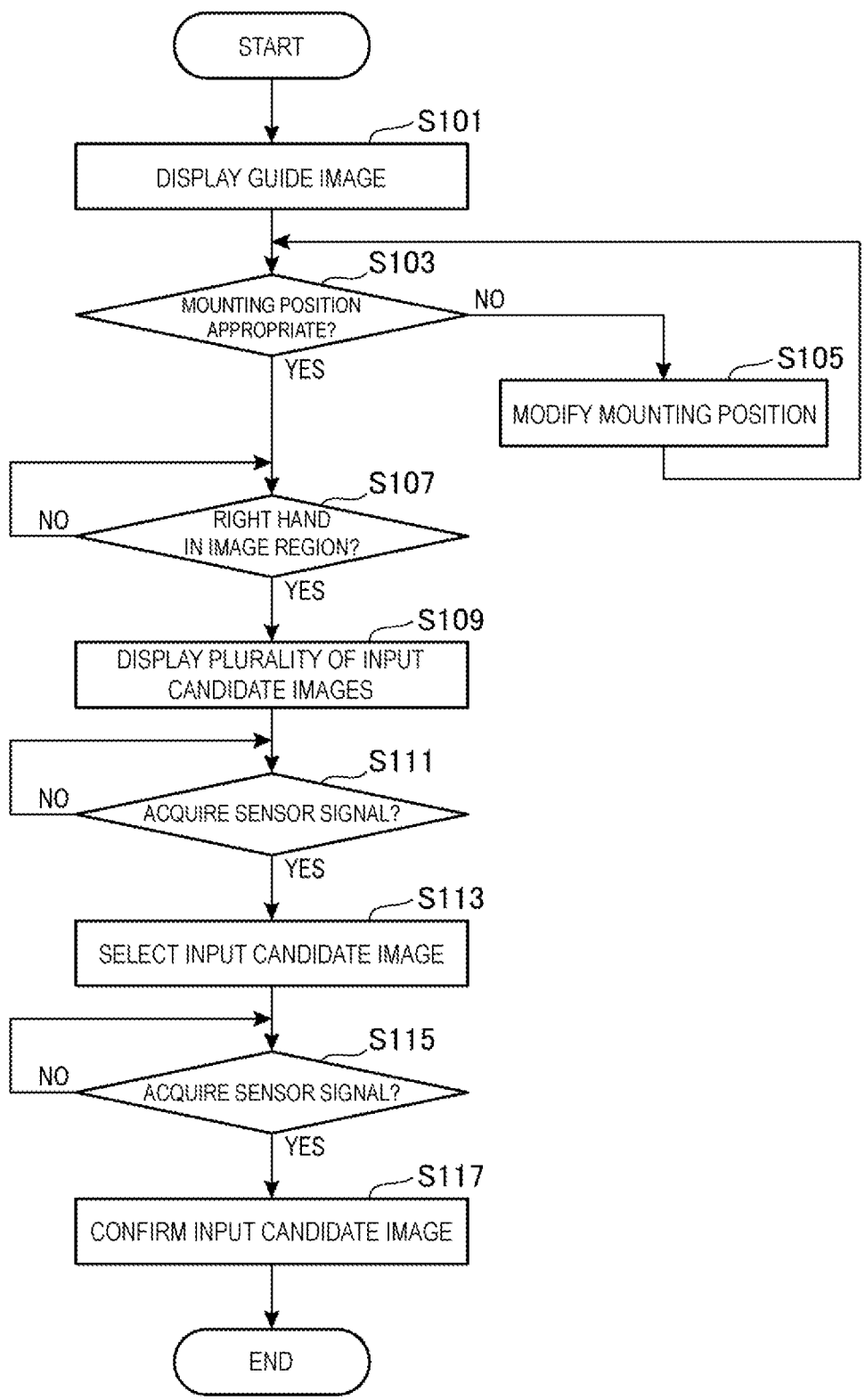
FIG. 9 is a flowchart illustrating a process of the control unit.

FIG. 9 is a flowchart illustrating a process of the control unit 141. Note that in the first exemplary embodiment, a case in which the user's right hand HP is disposed at the position indicated by the first guide image GL1 will be described.

As illustrated in FIG. 9, first, in step S101, the display control unit 142 displays the guide image GL. The guide image GL includes a first guide image GL1 that guides the position of the user's right hand HP and a second guide image GL2 that guides the position of the myoelectric sensor 200.

Next, at step S103, the display control unit 142 determines whether the position PS1 on which the myoelectric sensor 200 is worn is appropriate, based on the second guide image GL2. When the display control unit 142 determines that the location PS1 on which the myoelectric sensor 200 is worn is appropriate (YES in step S103), the process proceeds to step S107. When the display control unit 142 determines that the location PS1 on which the myoelectric sensor 200 is worn is not appropriate (NO in step S103), the process proceeds to step S105.

Then, in step S105, the user modifies the position PS1 on which the myoelectric sensor 200 is worn. In other words, the display control unit 142 detects that the position PS1 on which the myoelectric sensor 200 is worn is not appropriate, and displays by flashing the second guide image GL2. Then, the display control unit 142 detects that the position PS1 on which the myoelectric sensor 200 is worn is modified. The process then returns to step S103.

When step S103 is YES, in step S107, the display control unit 142 determines whether the user's right hand HP is included in the image region AR2. Specifically, the display control unit 142 determines whether all fingers and palm of the user's right hand HP are included in the image region AR2.

When the display control unit 142 determines that the user's right hand HP is not included in the image region AR2 (NO in step S107), the process goes into a waiting state. When the display control unit 142 determines that the user's right hand HP is included in the image region AR2 (YES in step S107), the process proceeds to step S109.

Then, in step S109, the display control unit 142 causes the image display unit 20 to display the plurality of input candidate images MN. Specifically, the display control unit 142 causes the image display unit 20 to display the plurality of input candidate images MN at a position overlapping the user's right hand HP visually recognized through the image display unit 20.

Next, in step S111, the acquisition unit 143 determines whether the detected value of the myoelectric sensor 200 is acquired. Note that in the first exemplary embodiment, the detected value of the myoelectric sensor 200 may be described as a "sensor signal".

When the acquisition unit 143 determines that the detected value of the myoelectric sensor 200 is not acquired (NO in step S111), the process goes into a waiting state.

When the acquisition unit 143 determines that the detected value of the myoelectric sensor 200 is acquired (YES in step S111), the process proceeds to step S113.

Then, in step S113, the operation detection unit 144 selects one input candidate image MA from among the plurality of input candidate images MN, based on the detected value of the myoelectric sensor 200.

Next, in step S115, the acquisition unit 143 determines whether the detected value of the myoelectric sensor 200 is acquired.

When the acquisition unit 143 determines that the detected value of the myoelectric sensor 200 is not acquired (NO in step S115), the process goes into a waiting state. When the acquisition unit 143 determines that the detected value of the myoelectric sensor 200 is acquired (YES in step S115), the process proceeds to step S117.

Then, in step S117, the operation detection unit 144 confirms the selection of one input candidate image MA selected in step S113, based on the detected value of the myoelectric sensor 200, and the process ends.

Note that step S109 corresponds to an example of the "display control step". Each of steps S111 and S115 corresponds to an example of the "acquisition step". Each of steps S113 and S117 corresponds to an example of an "operation detection step".

As described above with reference to FIGS. 1 to 9, in the first exemplary embodiment, the display control unit 142 causes the image display unit 20 to display the image M for input at a position overlapping the user's right hand HP visually recognized through the image display unit 20. The acquisition unit 143 acquires the detected value of the myoelectric sensor 200 mounted on the wrist of the user's right hand HP. The operation detection unit 144 detects an operation corresponding to the image M for input displayed by the image display unit 20, based on the detected value of the myoelectric sensor 200 acquired by the acquisition unit 143.

Thus, the user can easily perform operations corresponding to the image M for input. Thus, the operability of the HMD 100 can be improved.

The image M for input includes a plurality of input candidate images MN. The operation detection unit 144 detects the operation of selecting one input candidate image MA from among the plurality of input candidate images MN, based on the detected value of the myoelectric sensor 200.

Thus, the user can easily select one input candidate image MA from among the plurality of input candidate images MN. Accordingly, the operability of the HMD 100 can be further improved.

The image M for input includes an input candidate image M24 that confirms a selection of one input candidate image MA. The input candidate image M24 corresponds to an example of the "confirmation image". The operation detection unit 144 detects an operation that confirms a selection of one input candidate image MA, based on the detected value of the myoelectric sensor 200.

Thus, the user can easily confirm the selection of one input candidate image MA. Accordingly, the operability of the HMD 100 can be further improved.

Each of the plurality of input candidate images MN indicates characters that are different from each other. The operation detection unit 144 detects an operation of inputting characters, based on the detected value of the myoelectric sensor 200.

Thus, the user can easily perform the operation of inputting characters. Accordingly, the operability of the HMD 100 can be further improved.

Each of the plurality of input candidate images MN is associated with a region segmented by the joints at fingers of the user's right hand HP.

Thus, the user can further easily perform the operation of inputting characters. Accordingly, the operability of the HMD 100 can be further improved.

The plurality of input candidate images MN are respectively associated with regions segmented by the joints at each finger, excluding the thumb FP1 of the user's right hand HP. The operation of selecting one input candidate image MA is an operation of pressing the thumb FP1 of the user's right hand HP to a region segmented by the joints. Thus, the myoelectric sensor 200 can accurately detect the operation of selecting one input candidate image MA. In addition, the user can perform the operation of selecting one input candidate image MA by using only the right hand HP. Accordingly, the operability of the HMD 100 can be further improved.

The display control unit 142 causes the image display unit 20 to display the first guide image GL1 that guides the position of the user's right hand HP.

Thus, for example, by causing the image display unit 20 to display the second guide image GL2 that guides the position of the myoelectric sensor 200, the myoelectric sensor 200 can be mounted to the user in a proper position. Accordingly, the operation of selecting one input candidate image MA can be detected more accurately. As a result, the operability of the HMD 100 can be further improved.

The display control unit 142 tracks the position of the user's hand visually recognized through the image display unit 20 and adjusts the display position of the image M for input in response to the movement of the user's hand.

Thus, even when the user's hand moves, the image M for input can be displayed at the proper position. Accordingly, the operability of the HMD 100 can be further improved.

Note that in the first exemplary embodiment, the image M for input includes, but is not limited to, a plurality of input candidate images MN. The image M for input may include at least one image. For example, the image M for input may be composed of only one image. In this case, the operation detection unit 144 detects whether or not an operation is on one image. The operation detection unit 144 may detect a type of operation on one image.

In the first exemplary embodiment, the display control unit 142 displays, but is not limited to, the image M for input at a position overlapping the user's right hand HP. The display control unit 142 may display the image M for input at a position overlapping the user's hand. For example, the display control unit 142 may display the image M for input at a position overlapping the left hand of the user. For example, the display control unit 142 may display the image M for input at positions overlapping with both hands of the user. In this case, a larger number of input candidate images MN can be displayed in comparison to a case of displaying the image M for input at a position overlapping the user's right hand HP.

In the first exemplary embodiment, a case in which each of the plurality of input candidate images MN indicates a number has been described, but the present disclosure is not limited thereto. Each of the plurality of input candidate images MN may indicate a symbol. Here, the "symbol" includes characters, mathematical symbols, graphic symbols, and the like. Characters include alphabet, hiragana, and katakana. For example, each of the plurality of input candidate images MN may indicate one letter of alphabet. In this case, text input is enabled.

Figure 10:
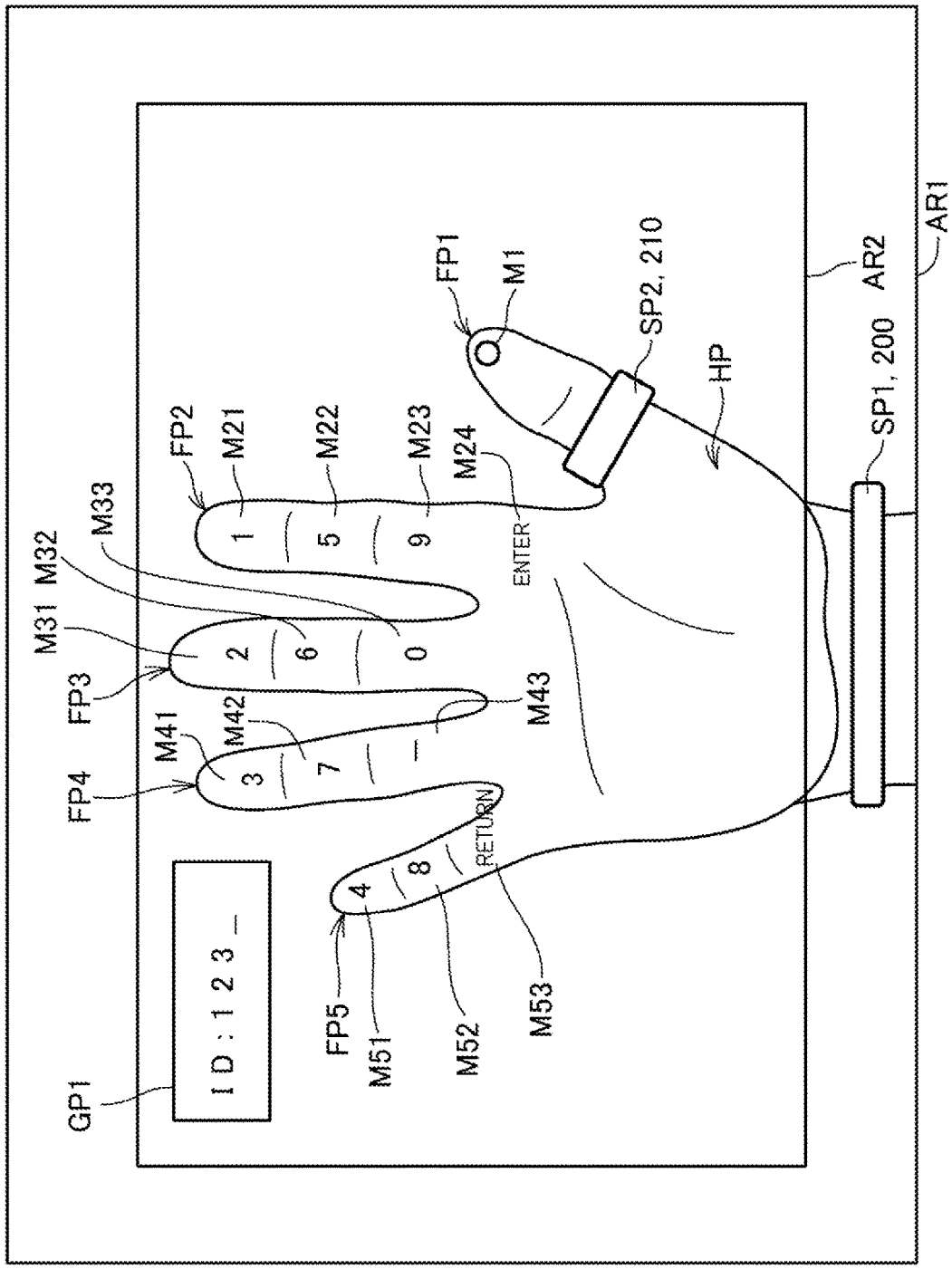
FIG. 10 is a diagram illustrating another configuration of a sensor.

FIG. 10 is a diagram illustrating another configuration of a sensor. As illustrated in FIG. 10, the sensor differs from the first exemplary embodiment in that the sensor includes a gyro sensor 210 in addition to the myoelectric sensor 200.

In the following description, differences from the first exemplary embodiment will be mainly described, and descriptions of configurations that are the same as those of the first exemplary embodiment will be omitted.

The gyro sensor 210 is mounted to the thumb FP1 of the user's right hand HP. The gyro sensor 210 detects an angular velocity in three-axial directions of the thumb FP1.

The acquisition unit 143 acquires the detected value of the myoelectric sensor 200 and the detected value of the gyro sensor 210.

The signal storage unit 145 stores the detected value of the myoelectric sensor 200 and the detected value of the gyro sensor 210.

Specifically, the signal storage unit 145 stores the detected value of the myoelectric sensor 200 corresponding to the operation of selecting each of the plurality of input candidate images MN and the detected value of the gyro sensor 210 corresponding to the operation of selecting each of the plurality of input candidate images MN.

The operation detection unit 144 detects the operation of selecting one input candidate image MA from among the plurality of input candidate images MN, based on the detected value of the myoelectric sensor 200 and the detected value of the gyro sensor 210.

Specifically, the operation detection unit 144 performs the following processes, based on the detected values of the myoelectric sensor 200 and the gyro sensor 210 and the detected values of the myoelectric sensor 200 and the gyro sensor 210 stored in the signal storage unit 145. In other words, the operation detection unit 144 detects the operation of selecting one input candidate image MA from among the plurality of input candidate images MN.

As described above with reference to FIG. 10, in the exemplary embodiment, the sensor includes the myoelectric sensor 200 mounted on the wrist of the user's right hand HP and the gyro sensor 210 mounted to the thumb FP1 of the user's right hand HP.

Thus, the operation detection unit 144 can further accurately detect the operation of selecting one input candidate image MA from among the plurality of input candidate images MN. Accordingly, the operability of the HMD 100 can be further improved.

Note that, in the exemplary embodiment, the sensor includes the myoelectric sensor 200 mounted on the wrist of the user's right hand HP and the gyro sensor 210 mounted to the thumb FP1 of the user's right hand HP, but the present disclosure is not limited to thereto. The sensor may be capable of detecting movement of the thumb FP1. For example, the sensor mounted to the thumb FP1 of the right hand HP may be a three-axis acceleration sensor or a six-axis sensor. The six-axis sensor is a motion sensor (inertial sensor) including a three-axis acceleration sensor and a three-axis gyro (angular velocity) sensor. The six-axis sensor may adopt an IMU in which the sensors described above are provided as a module.

For example, the gyro sensor 210 may be mounted on a finger other than the thumb FP1 of the right hand HP. In particular, the index finger FP2, the middle finger FP3, the ring finger FP4, and the pinky finger FP5 of the right hand HP may also be mounted with the gyro sensor 210.

Second Exemplary Embodiment

Figure 11:
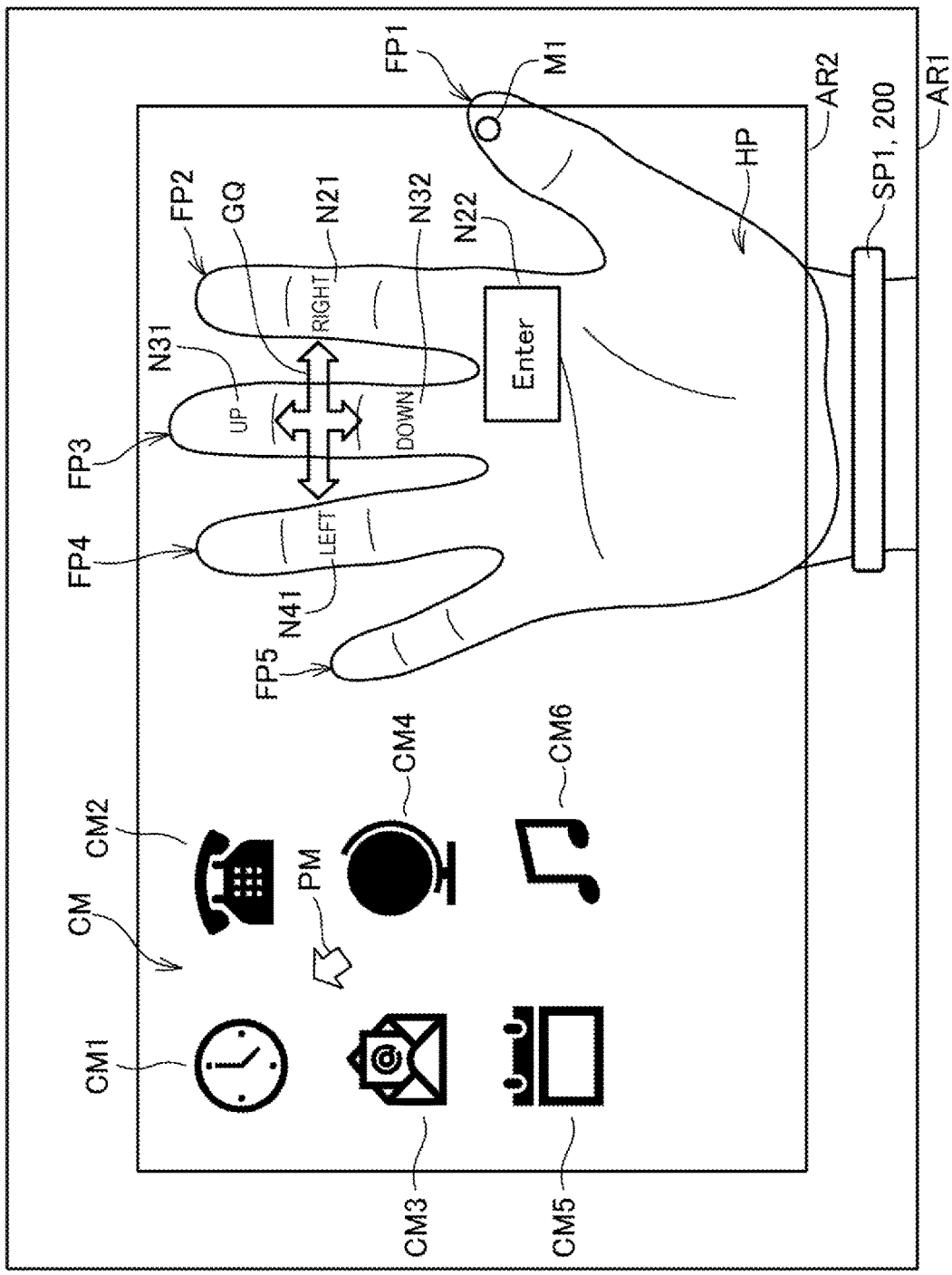
FIG. 11 is a diagram illustrating an input candidate image according to a second exemplary embodiment.

FIG. 11 is a diagram illustrating input candidate images MN according to the second exemplary embodiment. As in FIG. 7, the visual field region AR1 and the image region AR2 are illustrated in FIG. 11.

The image region AR2 includes the user's right hand HP. Furthermore, the myoelectric sensor 200 is mounted at the position PS1 on the wrist of the user's right hand HP.

As described with reference to FIG. 8, in the first exemplary embodiment, the HMD 100 receives user ID input, whereas in the second exemplary embodiment, the HMD 100 is different in that the HMD 100 receives the selection of an icon.

As illustrated in FIG. 11, icon images CM and a pointer image PM are displayed in the image region AR2.

The icon images CM include a first icon image CM1, a second icon image CM2, a third icon image CM3, a fourth icon image CM4, a fifth icon image CM5, and a sixth icon image CM6.

Each of the first icon image CM1 to the sixth icon image CM6 is associated with various functions. The pointer image PM is arranged at a position of each of the first icon image CM1 to the sixth icon image CM6, and various functions are performed when the enter image N22 is selected.

The first icon image CM1 is associated with, for example, a function of displaying a time. The second icon image CM2 is associated with a function of making a phone call. The third icon image CM3 is associated with a function of performing a mailer sending and receiving email. The fourth icon image CM4 is associated with a function of executing a browser that connects to the Internet. The fifth icon image CM5 is associated with a function to display a calendar. The sixth icon image CM6 is associated with a playback function for playing audio data.

The pointer image PM moves in a direction indicated by each of the plurality of input candidate images MN. Specifically, the display control unit 142 moves the pointer image PM in the direction indicated by each of the plurality of input candidate images MN.

The user's right hand HP includes a thumb FP1, an index finger FP2, a middle finger FP3, a ring finger FP4, and a pinky finger FP5.

Similar to FIG. 8, the thumb FP1 includes a first joint FP11 and a second joint FP12. The index finger FP2 includes a first joint FP21, a second joint FP22, and a third joint FP23. The middle finger FP3 includes a first joint FP31, a second joint FP32, and a third joint FP33. The ring finger FP4 includes a first joint FP41, a second joint FP42, and a third joint FP43. The pinky finger FP5 includes a first joint FP51, a second joint FP52, and a third joint FP53. In FIG. 11, reference signs corresponding to two joints of the thumb FP1, and three joints of each of the index finger FP2, the middle finger FP3, the ring finger FP4, and the pinky finger FP5 are omitted.

The plurality of input candidate images MN includes a right image N21, a left image N41, an upper image N31, a lower image N32, and an enter image N22.

The right image N21 is displayed in the index finger FP2 in the region between the first joint FP21 and the second joint FP22. The right image N21 is selected when the pointer image PM moves in the right direction.

The left image N41 is displayed in the ring finger FP4 in the region between the first joint FP41 and the second joint FP42. The left image N41 is selected when the pointer image PM moves in the left direction.

The upper image N31 is displayed in the region on the tip side from the first joint FP31 of the middle finger FP3. The upper image N31 is selected when the pointer image PM moves in the upward direction.

The lower image N32 is displayed in the middle finger FP3 in the region between the second joint FP32 and the third joint FP33. The lower image N32 is selected when the pointer image PM moves in the downward direction.

The enter image N22 is displayed in a region of the palm adjacent to the third joint FP23 of the index finger FP2. The enter image N22 is selected when a function corresponding to the icon image in which the pointer image PM is disposed is performed.

As illustrated in FIG. 11, an arrow image GQ is further arranged in the image region AR2. The arrow image GQ is arranged between the upper image N31 and the lower image N32 in the vertical direction, and is disposed between the right image N21 and the left image N41 in the left-right direction.

The arrow image GQ indicates the functions of each of the right image N21, the left image N41, the upper image N31, and the lower image N32.

The display control unit 142 causes the image display unit 20 to display the right image N21 at a position overlapping the region between the first joint FP21 and the second joint FP22 in the index finger FP2 of the user's right hand HP visually recognized through the image display unit 20.

The display control unit 142 causes the image display unit 20 to display the left image N41 at a position overlapping the region between the first joint FP41 and the second joint FP42 in the ring finger FP4 of the user's right hand HP visually recognized through the image display unit 20.

The display control unit 142 causes the image display unit 20 to display the upper image N31 at a position overlapping the region on the tip side from the first joint FP31 in the middle finger FP3 of the user's right hand HP visually recognized through the image display unit 20.

The display control unit 142 causes the image display unit 20 to display the lower image N32 at a position overlapping the region between the second joint FP32 and the third joint FP33 in the middle finger FP3 of the user's right hand HP visually recognized through the image display unit 20.

The display control unit 142 causes the image display unit 20 to display the enter image N22 at a position overlapping a region of the palm adjacent to the third joint FP23 of the index finger FP2 of the user's right hand HP visually recognized through the image display unit 20.

The operation detection unit 144 detects the operation of selecting one input candidate image MA from among the plurality of input candidate images MN, based on the detected value of the myoelectric sensor 200.

Specifically, the operation of selecting one input candidate image MA is an operation of pressing the thumb FP1 of the user's right hand HP to a region segmented by the joints.

For example, when selecting the right image N21, the user performs an operation of pressing the region on the tip side from the first joint FP11 of the thumb FP1 to the region between the first joint FP21 and the second joint FP22 of the index finger FP2.

The operation detection unit 144 detects the operation of selecting one input candidate image MA from among the plurality of input candidate images MN, based on the detected value of the myoelectric sensor 200 acquired by the acquisition unit 143.

The plurality of input candidate images MN includes the right image N21, the left image N41, the upper image N31, the lower image N32, and the enter image N22.

The operation detection unit 144 detects the operation of selecting one input candidate image MA from among five input candidate images MN, based on the detected value of the myoelectric sensor 200 acquired by the acquisition unit 143.

The signal storage unit 145 stores the detected value of the myoelectric sensor 200 corresponding to the operation of selecting each of the five input candidate images MN.

The operation detection unit 144 detects the operation of selecting one input candidate image MA from among the five input candidate images MN, based on the detected value of the myoelectric sensor 200 and the detected value of the myoelectric sensor 200 stored in the signal storage unit 145.

For example, when the detected value of the myoelectric sensor 200 indicates an operation of pressing the region on the tip side of the first joint FP11 of the thumb FP1 to the region between the second joint FP32 and the third joint FP33 of the middle finger FP3, the operation detection unit 144 performs the following process. In other words, the operation detection unit 144 detects the operation of selecting the lower image N32.

In this way, the operation detection unit 144 detects the operation of selecting one input candidate image MA from among the five input candidate images MN, based on the detected value of the myoelectric sensor 200 and the detected value of the myoelectric sensor 200 stored in the signal storage unit 145. As a result, a function corresponding to each of the first icon image CM1 to the sixth icon image CM6 can be performed by the HMD 100.

As described above with reference to FIG. 11, in the HMD 100 according to the second exemplary embodiment, the plurality of input candidate images MN includes the right image N21, the left image N41, the upper image N31, and the lower image N32.

Thus, the pointer image PM can be moved in a direction desired by the user. Accordingly, the operability of the HMD 100 can be further improved.

In the HMD 100 according to the second exemplary embodiment, the first icon image CM1 to the sixth icon image CM6 are displayed. The plurality of input candidate images MN include the enter image N22.

Thus, by moving the pointer image PM to a position of any one of the first icon image CM1 to the sixth icon image CM6, and by the user selecting the enter image N22, a function associated with each of the first icon image CM1 to the sixth icon image CM6 can be performed. Accordingly, the operability of the HMD 100 can be further improved.

Note that in the second exemplary embodiment, the icon images CM include six icon images, but the present disclosure is not limited thereto. The icon images CM may include at least one icon image.

In the second exemplary embodiment, any one of the first icon image CM1 to the sixth icon image CM6 is selected by the pointer image PM, but the present disclosure is not limited thereto. The pointer image PM may select an object. For example, a plurality of button objects are displayed, and one button object may be selected from among the plurality of button objects by the pointer image PM.

Figure 12:
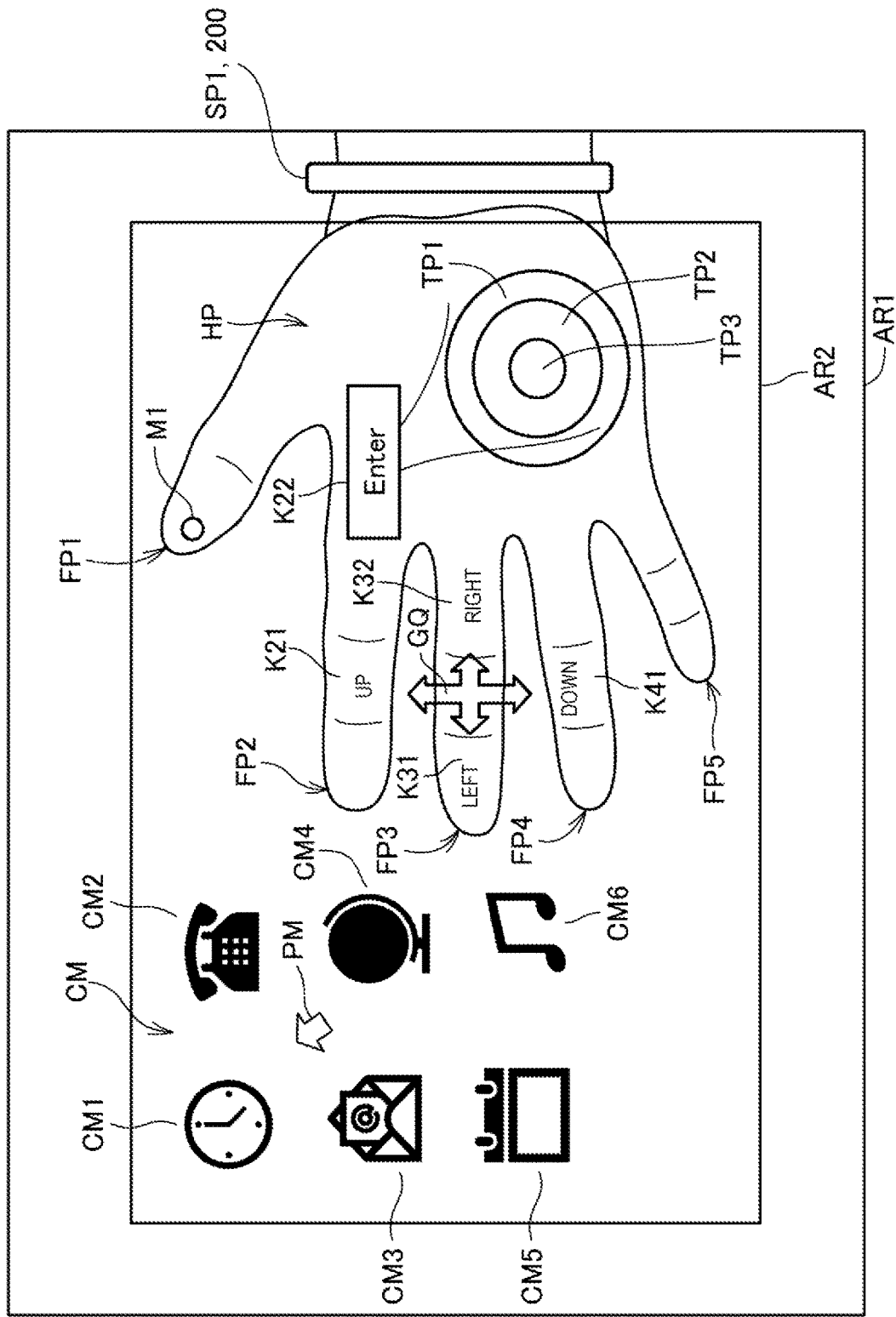
FIG. 12 is a diagram illustrating another configuration of an input candidate image.

FIG. 12 is a diagram illustrating another configuration of the input candidate images MN.

As illustrated in FIG. 12, the input candidate images MN differ from the input candidate images MN illustrated in FIG. 11 in that the right hand HP of the user arranged with the middle finger FP3 facing the left and right direction is displayed.

That is, the different is that the user's right hand HP illustrated in FIG. 11 is arranged such that the tip end of the middle finger FP3 faces upward, whereas the user's right hand HP illustrated in FIG. 12 is arranged such that the tip end of the middle finger FP3 faces leftward.

A difference is that, in FIG. 12, the input candidate images MN include an enlarge image TP1, a reduce image TP2, and a confirmation image TP3 in addition to the right image, left image, upper image, lower image, and enter image illustrated in FIG. 11.

In FIG. 12, similar to FIG. 11, reference signs corresponding to two joints of the thumb FP1, and three joints of each of the index finger FP2, the middle finger FP3, the ring finger FP4, and the pinky finger FP5 are omitted.

In the following description, differences from the second exemplary embodiment will be mainly described, and descriptions of configurations that are the same as those of the second exemplary embodiment will be omitted.

As illustrated in FIG. 12, the plurality of input candidate images MN include a right image K32, a left image K31, an upper image K21, a lower image K41, and an enter image K22.

The upper image K21 is displayed in the index finger FP2 in the region between the first joint FP21 and the second FP22 joint.

The left image K31 is displayed in the region on the tip side of the first joint FP31 of the middle finger FP3.

The right image K32 is displayed in the middle finger FP3 in the region between the second joint FP32 and the third joint FP33.

The lower image K41 is displayed in the ring finger FP4 in the region between the first joint FP41 and the second joint FP42.

The enter image K22 is displayed in a region of the palm adjacent to the third joint FP23 of the index finger FP2.

The display control unit 142 causes the image display unit 20 to display the upper image K21 at a position overlapping the region between the first joint FP21 and the second joint FP22 in the index finger FP2 of the user's right hand HP visually recognized through the image display unit 20.

The display control unit 142 causes the image display unit 20 to display the left image K31 at a position overlapping the region on the tip side from the first joint FP31 in the middle finger FP3 of the user's right hand HP visually recognized through the image display unit 20.

The display control unit 142 causes the image display unit 20 to display the right image K32 at a position overlapping the region between the second joint FP32 and the third joint FP33 in the middle finger FP3 of the user's right hand HP visually recognized through the image display unit 20.

The display control unit 142 causes the image display unit 20 to display the enter image K22 at a position overlapping a region of the palm adjacent to the third joint FP23 of the index finger FP2 of the user's right hand HP visually recognized through the image display unit 20.

The enlarge image TP1, the reduce image TP2, and the confirmation image TP3 are displayed in the palm of the hand of the user's right hand HP.

That is, the display control unit 142 causes the image display unit 20 to display the enlarge image TP1, the reduce image TP2, and the confirmation image TP3 at positions overlapping the region of the palm of the user's right hand HP.

The enlarge image TP1, the reduce image TP2, and the confirmation image TP3 are formed concentrically. The reduce image TP2 is located outside of the confirmation image TP3. The enlarge image TP1 is located outside of the reduce image TP2.

The enlarge image TP1 is selected when enlarging the icon images CM. When the enlarge image TP1 is selected, the display control unit 142 enlarges the icon images CM with a predetermined magnification. The predetermined magnification is 1.1 times, for example.

The reduce image TP2 is selected when reducing the icon images CM. When the reduce image TP2 is selected, the display control unit 142 reduces the icon images CM with a predetermined magnification. The predetermined magnification is 0.9 times, for example.

The confirmation image TP3 is selected when the display size of the icon images CM is confirmed.

The operation detection unit 144 detects the operation of selecting one input candidate image MA from among the plurality of input candidate images MN, based on the detected value of the myoelectric sensor 200 acquired by the acquisition unit 143.

The plurality of input candidate images MN are constituted by the right image K32, the left image K31, the upper image K21, the lower image K41, the enter image K22, the enlarge image TP1, the reduce image TP2, and the confirmation image TP3.

The signal storage unit 145 stores the detected value of the myoelectric sensor 200 corresponding to the operation of selecting each of the eight input candidate images MN.

The operation detection unit 144 detects the operation of selecting one input candidate image MA from among the eight input candidate images MN, based on the detected value of the myoelectric sensor 200 and the detected value of the myoelectric sensor 200 stored in the signal storage unit 145.

In this way, the operation detection unit 144 detects the operation of selecting one input candidate image MA from among the enlarge image TP1, the reduce image TP2, and the confirmation image TP3, based on the detected value of the myoelectric sensor 200 and the detected value of the myoelectric sensor 200 stored in the signal storage unit 145. As a result, the display size of the icon images CM can be reduced, enlarged, and confirmed.

Third Exemplary Embodiment

Figure 13:
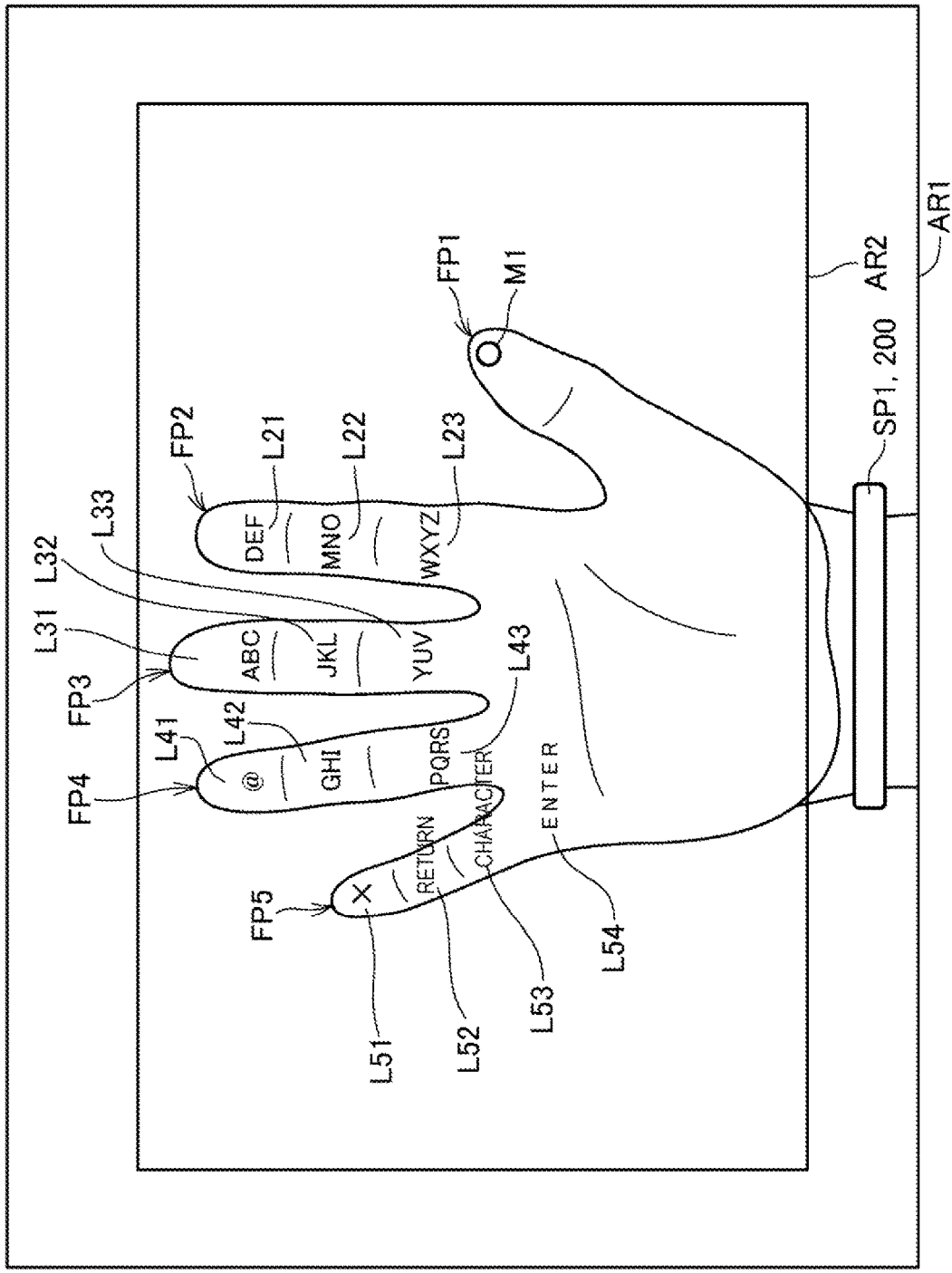
FIG. 13 is a diagram illustrating an input candidate image according to a third exemplary embodiment.

FIG. 13 is a diagram illustrating input candidate images MN according to a third exemplary embodiment. As in FIG. 7, the visual field region AR1 and the image region AR2 are illustrated in FIG. 13.

The image region AR2 includes the user's right hand HP. Furthermore, the myoelectric sensor 200 is mounted at the position PS1 on the wrist of the user's right hand HP.

As described with reference to FIG. 8, in the first exemplary embodiment, the HMD 100 receives numerical input, whereas in the third exemplary embodiment, the HMD 100 is different in that the HMD 100 receives an input such as alphabet.

Each of the plurality of input candidate images MN indicates characters that are different from each other. For example, each of the plurality of input candidate images MN includes alphabets of "A" to "Z", a "@" mark, a back space command, a return command, a character type change command, and an enter command. The back space command indicates a command to delete the input characters by one character. The return command indicates a command to cancel one operation made immediately before. The character type change command indicates a command to change the type of character to be input. The enter command indicates a command to confirm the input operation.

The plurality of input candidate images MN are associated with regions segmented by joints in the fingers of the user's right hand HP.

More specifically, the plurality of input candidate images MN are associated with regions segmented by the joints in each finger, excluding the thumb FP1 of the user's right hand HP.

The user's right hand HP includes a thumb FP1, an index finger FP2, a middle finger FP3, a ring finger FP4, and a pinky finger FP5.

The index finger FP2 includes a first joint FP21, a second joint FP22, and a third joint FP23. The middle finger FP3 includes a first joint FP31, a second joint FP32, and a third joint FP33. The ring finger FP4 includes a first joint FP41, a second joint FP42, and a third joint FP43. The pinky finger FP5 includes a first joint FP51, a second joint FP52, and a third joint FP53. Reference signs corresponding to these joints are omitted from the illustration.

The two or more predetermined number of input candidate images included in the plurality of input candidate images MN are associated with regions segmented by joints in each finger excluding the thumb of the user's right hand HP.

For example, in the index finger FP2, three input candidate images L21 are displayed in the region on the tip side of the first joint FP21. The three input candidate images L21 indicate an alphabet of "D", an alphabet of "E", and an alphabet of "F". In this case, the predetermined number is "3".

For example, in the index finger FP2, three input candidate images L22 are displayed in the region between the first joint FP21 and the second joint FP22. The three input candidate images L22 indicate an alphabet of "M", an alphabet of "N", and an alphabet of "O". In this case, the predetermined number is "3".

For example, in the index finger FP2, four input candidate images L23 are displayed in the region between the second joint FP22 and the third joint FP23. The four input candidate images L23 indicate an alphabet of "W", an alphabet of "X", an alphabet of "Y", and an alphabet of "Z". In this case, the predetermined number is "4".

The operation detection unit 144 detects the operation of selecting one input candidate image MA from among the plurality of input candidate images MN, based on the detected value of the myoelectric sensor 200.

Specifically, the operation detection unit 144 detects the operation of selecting a region segmented by joints and the operation of selecting one input candidate image MA from a predetermined number of input candidate images MB associated with the regions, based on the detected value of the myoelectric sensor 200.

First, the operation of selecting a region segmented by joints is an operation of pressing the thumb FP1 of the user's right hand HP to a region segmented by joints in each of the index FP2, the middle finger FP3, the ring finger FP4, and the pinky finger FP5. By selecting a region segmented by joints, a predetermined number of input candidate images MB are selected from among the plurality of input candidate images MN.

Next, the operation of selecting one input candidate image MA from a predetermined number of input candidate images MB associated with the regions is an operation of moving the thumb FP1 of the user's right hand HP in a predetermined direction.

More specifically, for example, in the index finger FP2, when the region between the second joint FP22 and the third joint FP23 is selected, one input candidate image MA is selected in the following manner.

That is, when selecting an alphabet of "W", the user performs an operation of moving the thumb FP1 of the right hand HP in a direction toward the tip end of the index finger FP2 (upward). When selecting an alphabet of "X", the user performs an operation of moving the thumb FP1 of the right hand HP in a direction away from the middle finger FP3 (rightward). When selecting an alphabet of "Y", the user performs an operation of moving the thumb FP1 of the right hand HP in a direction toward the base end of the index finger FP2 (downward). When selecting an alphabet of "Z", the user performs an operation of moving the thumb FP1 of the right hand HP in a direction toward the middle finger FP3 (leftward).

In this manner, the operation detection unit 144 detects the operation of selecting a region segmented by joints and the operation of selecting one input candidate image MA from a predetermined number of input candidate images MB associated with the regions, based on the detected value of the myoelectric sensor 200. Thus, the user may input alphabets.

As described above with reference to FIG. 13, in the third exemplary embodiment, two or more predetermined number of input candidate images MB included in the plurality of input candidate images MN are associated with regions segmented by joints in each finger excluding the thumb FP1 of the user's right hand HP. The operation of selecting a region is an operation of pressing the thumb FP1 of the user's right hand HP to a region segmented by the joints. The operation of selecting one input candidate image MA from a predetermined number of input candidate images MB associated with the region is an operation of moving the thumb FP1 of the user's right hand HP in a predetermined direction.

Thus, the myoelectric sensor 200 can accurately detect the operation of selecting one input candidate image MA. The user can perform the operation of selecting one input candidate image MA from a number of input candidate images MN, such as alphabets, using only the right hand HP. Accordingly, the operability of the HMD 100 can be further improved.

The present disclosure is not limited to the exemplary embodiments configured as described above. The present disclosure can be implemented in various aspects, as long as the aspects fall within the scope of the present disclosure.

For example, in the exemplary embodiments described above, the configuration in which the control device 10 is coupled to the image display unit 20 by wire is illustrated, however, the present disclosure is not limited thereto, and the image display unit 20 may be configured to be coupled wirelessly to the control device 10. The method exemplified as a communication method compatible with the communication unit 117 may be adopted as a wireless communication method in this case, or another communication method may be used.

A part of the functions of the control device 10 may be provided in the image display unit 20. The control device 10 may be achieved by a plurality of devices. For example, instead of the control device 10, a wearable device may be used that can be attached to the body or clothes of the user, or to the personal adornments worn by the user. The wearable device in such a case may be, for example, a watch-like device, a ring-like device, a laser pointer, a mouse, an air mouse, a game controller, a pen-like device, or the like.

In addition, in the exemplary embodiments described above, the configuration in which the image display unit 20 and the control device 10 are segmented, and are coupled via the coupling cable 40 has been illustrated as an example. The present disclosure is not limited to this, and a configuration mounted on a head of the user in which the control device 10 and the image display unit 20 are integrally formed may also be used.

Further, in the exemplary embodiments described above, the configuration in which the user visually recognize an outside scene through the display unit is not limited to a configuration where the right light-guiding plate 26 and the left light-guiding plate 28 transmit outside light. For example, the present disclosure is applicable to a display device configured to display an image in a state where an outside scene cannot be visually recognized. Specifically, the present disclosure can be applied to a display apparatus configured to display images captured by the camera 61, images and CG generated based on the captured images, and movies based on the movie data stored beforehand, or the movie data input from outside. This kind of display device can include a so-called closed type display device in which an outside scene cannot be visually recognized. For example, with a configuration in which composite images created by combining together images of an outside scene captured by the camera 61 and display images are displayed by the image display unit 20, even if the image display unit 20 may not transmit outside light, the display apparatus can display the outside scene and images so as to be visually recognized by the user. Of course, it is also possible to apply the present disclosure to such a so-called video see-through display apparatus.

Further, instead of the image display unit 20, for example, another type of image display unit such as an image display unit to be worn like a cap, for example, may be employed. Such an image display unit may include a display unit configured to display images corresponding to the left eye LE of the user and a display unit configured to display images corresponding to the right eye RE of the user. Additionally, the display device may be configured, for example, as an HMD mounted on a vehicle such as a car and an airplane. Further, the display device may be configured, for example, as an HMD built into a body protector tool such as a helmet. In this case, a portion located in a position with respect to the body of the user, and a portion located with respect to such a portion can serve as mounted parts.

A configuration in which a virtual image is formed by the half mirrors 261 and 281 on a part of the right light-guiding plate 26 and the left light-guiding plate 28 has been illustrated as an optical system configured to guide imaging light to the eyes of the user. The present disclosure is not limited thereto, and an image may be displayed either on the entire surface of the right light-guiding plate 26 and the left light-guiding plate 28, or in a display region having an area that occupies most part of the right light-guiding plate 26 and the left light-guiding plate 28. In such a case, a process for reducing an image may be included in an operation of changing a display position of the image.

In addition, the optical elements are not limited to the right light-guiding plate 26 and the left light-guiding plate 28 having half mirrors 261 and 281, but any optical components that allow the imaging light to enter the eyes of the user, and specifically, diffraction grating, prisms, and holographic display units may be employed.

In addition, such a configuration may be adopted that at least some of the function blocks illustrated in FIG. 5 and FIG. 6 and the like are achieved with hardware, or achieved together with hardware and software, and the present disclosure is not limited to a configuration in which independent hardware resources are arranged as illustrated in the figures. A program executed by the control unit 141 may be stored in the nonvolatile storage unit 121 or another storage device (not illustrated) in the control device 10. A program stored in an external device may be acquired and executed through the communication unit 117 and the external connector 184. Among configurations formed in the control device 10, the operation unit 110 may be formed as the user interface (UI). A duplicate of a configuration formed in the control device 10 may be formed in the image display unit 20. For example, a processor similar to the main processor 140 may be arranged in the image display unit 20, or the main processor 140 included in the control device 10 and the processor of the image display unit 20 may be configured to perform separate functions.

What is claimed is:

1. A display device comprising:
 a display unit of a transmissive type that is mounted on a head of a user and configured to transmit light;
 a display control unit configured to display on the display unit an image for input at a position overlapping a hand of the user visually recognized through the display unit;
 an acquisition unit configured to acquire a detected value of a sensor mounted on the hand of the user; and
 an operation detection unit configured to detect an operation corresponding to the image for input that is displayed by the display unit, based on the detected value of the sensor acquired by the acquisition unit,
 wherein
 the image for input includes a plurality of input candidate images,
 the operation detection unit is configured to detect an operation of selecting one input value of the sensor,
 the display control unit is configured to display on the display unit a guide image for guiding a position of the hand of the user,
 the plurality of input candidate images are respectively associated with regions segmented by joints at each finger excluding a thumb of the hand of the user, and
 the operation of selecting the one input candidate image is an operation of pressing the thumb of the hand of the user against any of the regions segmented by the joints.

2. The display device according to claim 1, wherein
 the sensor includes a myoelectric sensor mounted on a wrist of the user, and
 the operation detection unit is configured to identify movement of the hand of the user from a detected value of the myoelectric sensor.

3. The display device according to claim 1, wherein
 the image for input includes a confirmation image for confirming a selection of the one input candidate image, and
 the operation detection unit is configured to detect an operation of confirming a selection of the one input candidate image, based on the detected value of the sensor.

4. The display device according to claim 1, wherein
 the plurality of input candidate images respectively indicate characters that are different from each other, and
 the operation detection unit is configured to detect an operation of entering a character, based on the detected value of the sensor.

5. The display device according to claim 1, wherein two or more predetermined number of input candidate images included in the plurality of input candidate images are associated with regions segmented by joints at each finger excluding the thumb of the hand of the user, an operation of selecting any of the regions is an operation of pressing the thumb of the hand of the user against any of the regions segmented by the joints, and an operation of selecting the one input candidate image from the predetermined number of input candidate images associated with the regions is an operation of moving the thumb of the hand of the user in a predetermined direction.

6. The display device according to claim 1, wherein the display control unit is configured to display on the display unit a guide image for guiding a position of the hand of the user.

7. The display device according to claim 1, wherein the display control unit is configured to track a position of the hand of the user visually recognized through the display unit, and adjust a display position of the image for input in response to movement of the hand of the user.

8. A display device comprising:

a display unit of a transmissive type that is mounted on a head of a user and configured to transmit light;

a display control unit configured to display on the display unit an image for input at a position overlapping a hand of the user visually recognized through the display unit;

an acquisition unit configured to acquire a detected value of a sensor mounted on the hand of the user; and an operation detection unit configured to detect an operation corresponding to the image for input that is displayed by the display unit, based on the detected value of the sensor acquired by the acquisition unit, wherein the sensor includes a myoelectric sensor mounted on a wrist of the user, the operation detection unit is configured to identify movement of the hand of the user from a detected value of the myoelectric sensor, and the sensor includes a gyro sensor mounted on a finger of the hand of the user.

9. A method of controlling a display device including a display unit of a transmissive type that is mounted on a head of a user and configured to transmit light, the method comprising:

a display control step for displaying on the display unit an image for input at a position overlapping a hand of the user visually recognized through the display unit;

an acquisition step for acquiring a detected value of a sensor mounted on the hand of the user; and an operation detection step for detecting an operation corresponding to the image for input that is displayed by the display unit, based on the detected value of the sensor acquired in the acquisition step, wherein the image for input includes a plurality of input candidate images, the operation detection step includes detecting an operation of selecting one input candidate image from among the plurality of input candidate images, based on the detected value of the sensor, the display control step includes displaying on the display unit a guide image for guiding a position of the hand of the user, the plurality of input candidate images are respectively associated with regions segmented by joints at each finger excluding a thumb of the hand of the user, and the operation of selecting the one input candidate image is an operation of pressing the thumb of the hand of the user against any of the regions segmented by the joints.

10. A method of controlling a display device including a display unit of a transmissive type that is mounted on a head of a user and configured to transmit light, the method comprising:

a display control step for displaying on the display unit an image for input at a position overlapping a hand of the user visually recognized through the display unit;

an acquisition step for acquiring a detected value of a sensor mounted on the hand of the user; and an operation detection step for detecting an operation corresponding to the image for input that is displayed by the display unit, based on the detected value of the sensor acquired in the acquisition step, wherein the sensor includes a myoelectric sensor mounted on a wrist of the user, the operation detection step includes identifying movement of the hand of the user from a detected value of the myoelectric sensor, and the sensor includes a gyro sensor mounted on a finger of the hand of the user.

* * * * *